US009065774B2

(12) United States Patent
Tanaka

(10) Patent No.: US 9,065,774 B2
(45) Date of Patent: Jun. 23, 2015

(54) DATA MANAGEMENT APPARATUS, COMMUNICATION CONTROL APPARATUS, AND SYSTEM INCLUDING DATA MANAGEMENT APPARATUS AND COMMUNICATION CONTROL APPARATUS

(75) Inventor: Hisashi Tanaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 321 days.

(21) Appl. No.: 13/563,920

(22) Filed: Aug. 1, 2012

(65) Prior Publication Data

US 2013/0036195 A1     Feb. 7, 2013

(30) Foreign Application Priority Data

Aug. 3, 2011   (JP) .................................. 2011-170177
Jul. 19, 2012   (JP) .................................. 2012-160654

(51) Int. Cl.
*G06F 15/16* (2006.01)
*H04L 12/24* (2006.01)

(52) U.S. Cl.
CPC ................................ *H04L 41/5061* (2013.01)

(58) Field of Classification Search
CPC .................... H04L 67/1097; H04L 41/0213
See application file for complete search history.

(56) References Cited

U.S. PATENT DOCUMENTS 5,715,496 A    2/1998  Sawada et al.
6,775,238 B1   8/2004  Suzuki
2009/0019114 A1 *  1/2009  Goto et al. ................... 709/205
2009/0235261 A1 *  9/2009  Ito ................................ 718/102
2011/0035492 A1 *  2/2011  Miyakawa ................... 709/224
2012/0102502 A1 *  4/2012  Mathur et al. ............... 719/313
2012/0216295 A1 *  8/2012  Ashida et al. ................. 726/27

FOREIGN PATENT DOCUMENTS

JP    H08-195849       7/1996
JP    2001-077965      3/2001
JP       4580639      11/2010

* cited by examiner

*Primary Examiner* — Djenane Bayard
(74) *Attorney, Agent, or Firm* — IPUSA, PLLC

(57) ABSTRACT

A data management apparatus for a data management system including first and second networks interposed by a communication control apparatus includes a reception unit receiving response request data pertaining to an electronic device from an external apparatus and response result data from the communication control apparatus, a transmission unit transmitting the response request data to the communication control apparatus, and a management unit managing a series of response status history data during a period between receiving of the response request data and receiving of the response result data responsive to the response request data based on the response request data and the response result data. The data management apparatus being connected to the first network and managing history data of the response request data. One or more service management apparatuses being connected to the second network and managing a response service corresponding to the response request data.

11 Claims, 11 Drawing Sheets

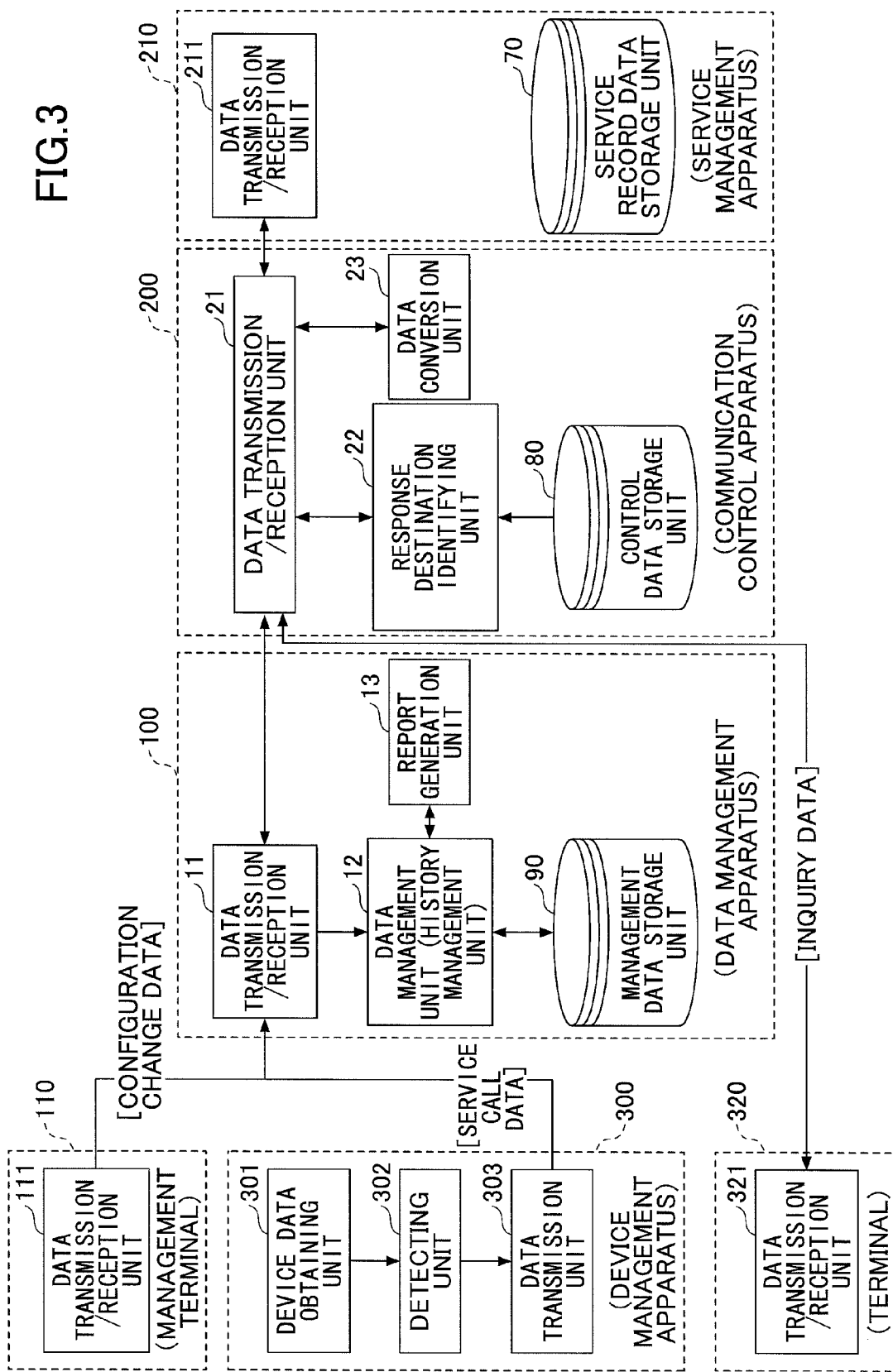

FIG.4

| HISTORY ID | TYPE | SPECIFIC TYPE | DEVICE TYPE | RESPONSE STATUS | DATE/TIME | 90D |
|---|---|---|---|---|---|---|
| 1 | SC | OUT OF PAPER | MFP001 | REQUESTING | 2011/04/01 13:00 | ... |
| 2 | SC | OUT OF XX TONER | MFP002 | REQUESTING | 2011/04/01 14:00 | ... |
| 3 | CONFIGURATION CHANGE | TRANSFER OF DEVICE | PJ001 | REQUESTING | 2011/04/01 15:00 | ... |
| 4 | INQUIRY | XX INQUIRY | MFP004 | REQUESTING | 2011/04/01 16:00 | ... |
| 5 | SC | OUT OF PAPER | MFP001 | COMPLETE | 2011/04/01 13:15 | ... |
| 6 | SC | OUT OF XX TONER | MFP002 | COMPLETE | 2011/04/01 14:10 | ... |
| 7 | CONFIGURATION CHANGE | TRANSFER OF DEVICE | PJ001 | COMPLETE | 2011/04/01 15:15 | ... |
| 8 | INQUIRY | XX INQUIRY | MFP004 | COMPLETE | 2011/04/01 16:30 | ... |
| ... | ... | ... | ... | ... | ... | ... |

FIG.5

| CUSTOMER ID | RESPONSE DESTINATION ID (TRANSFER DESTINATION ID) |
|---|---|
| U001 | SMS001 |
| U002 | SMS002 |
| U003 | SMS003 |
| .... | .... |

80D

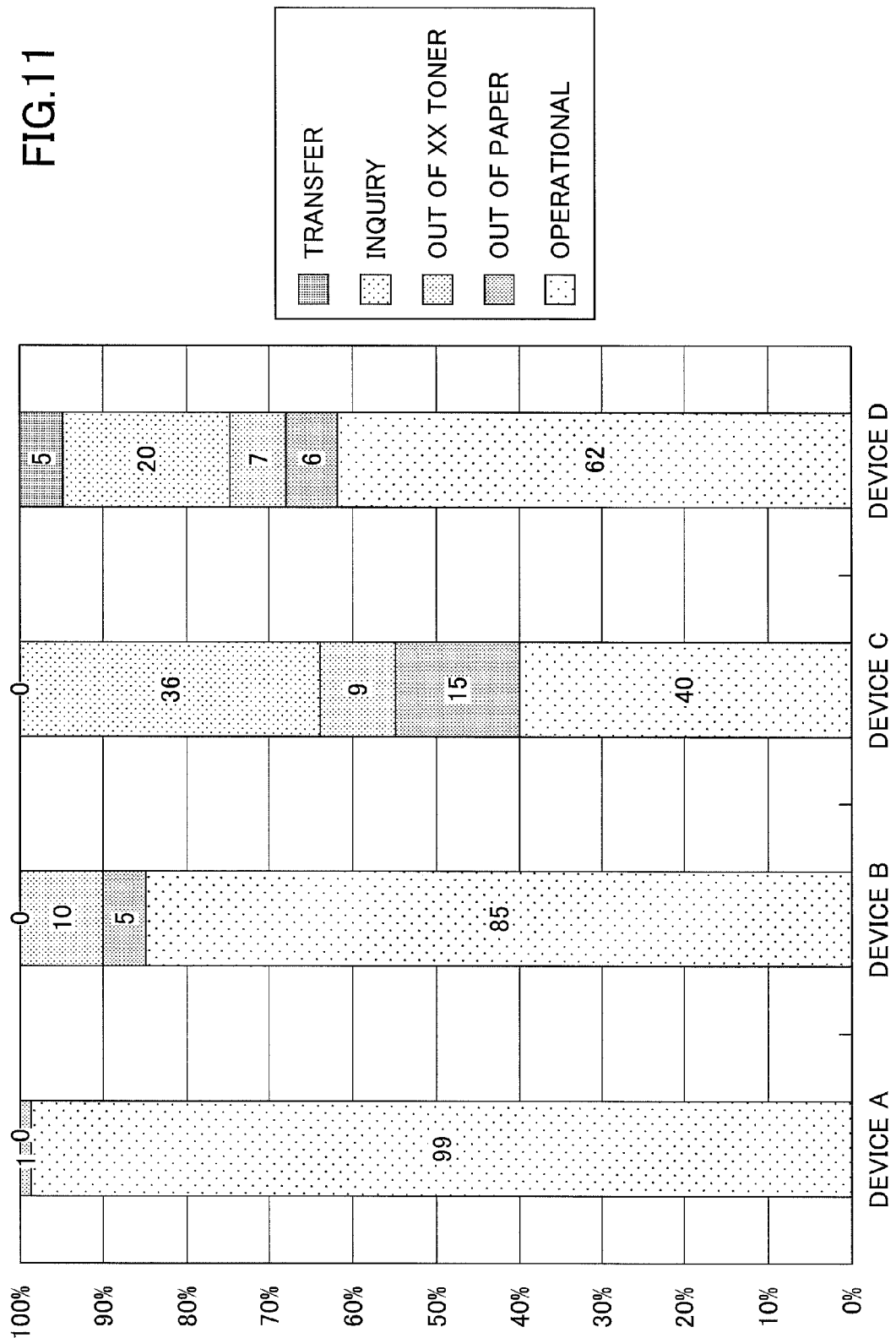

DATA MANAGEMENT APPARATUS, COMMUNICATION CONTROL APPARATUS, AND SYSTEM INCLUDING DATA MANAGEMENT APPARATUS AND COMMUNICATION CONTROL APPARATUS

BACKGROUND OF THE INVENTION

1. Field of the Invention

The present invention relates to a data management apparatus, a communication control apparatus, and a data management system including the data management apparatus and the communication control apparatus.

2. Description of the Related Art

In a case where an electronic device such as an image processing apparatus is introduced into a customer environment, it becomes necessary to replace or replenish consumable supplies and components (hereinafter also simply referred to as "consumable supplies") depending on the manner in which the electronic device is used. Further, in a case where a failure (malfunction) occurs in the electronic device, it becomes necessary to fix the failure. Accordingly, the customer confirms the status of the electronic device and makes an inquiry to a corresponding manufacturer or the distributor (vendor) according to the confirmed status of the electronic device.

In order to support the customer in these instances, a device management service is provided. For example, Japanese Patent No. 4580639 discloses a system an automatic order service for automatically ordering consumable supplies of an electronic device.

However, according to a related art example, it is difficult to provide a high quality device management service. It is desired for a device management service that can manage and provide service of an equal level to all introduced electronic devices together regardless of the customer environment (e.g., location) of the electronic device. It is also desired for the device management service to guarantee a certain degree of quality not only in ordering or fixing consumable supplies but also in making appropriate proposals to improve the customer environment (e.g., introducing new electronic devices, transferring/replacing/removing electronic devices), in changing the configuration of the electronic devices based on the proposals, or in attending to various inquires from the customer.

According to a related art example (e.g., Japanese Patent No. 4580639), the functions of the device management service are separately automated and provided to the customer (plural management tools being provided to the customer). With this device management service, it is necessary to manually gather (count) order status data or response status data in order to make proposals of improvement. Thus, there is a lack of accuracy and rapidness with the device management service according to the related art example. As a result, the device management service according to the related art example is unable to provide a high quality service.

Further, in order to improve the quality of the device management service, the entity that receives inquiries from the customer is required to input data accurately and manage data in view of the results of the responses to the inquiries.

SUMMARY OF THE INVENTION

The present invention may provide a data management apparatus, a communication control apparatus, and a data control system including the data management system and the communication control apparatus that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data management apparatus, a communication control apparatus, and a data control system including the data management system and the communication control apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data management apparatus for a data management system including first and second networks interposed by a communication control apparatus, the data management apparatus including: a reception unit configured to receive response request data pertaining to an electronic device from an external apparatus and response result data from the communication control apparatus; a transmission unit configured to transmit the response request data to the communication control apparatus; and a management unit configured to manage a series of response status history data during a period between receiving of the response request data and receiving of the response result data responsive to the response request data based on the response request data and the response result data; wherein the data management apparatus is connected to the first network and configured to manage history data of the response request data, wherein one or more service management apparatuses are connected to the second network and configured to manage a response service corresponding to the response request data.

Other objects, features and advantages of the present invention will become more apparent from the following detailed description when read in conjunction with the accompanying drawings.

BRIEF DESCRIPTION OF THE DRAWINGS

FIG. 3 is a schematic diagram illustrating a configuration of functions (function units) according to an embodiment of the present invention;

FIG. 4 is a schematic diagram illustrating examples of data included in management data according to an embodiment of the present invention;

FIG. 5 is a schematic diagram illustrating an example of a configuration of the control data according to an embodiment of the present invention;

FIG. 11 is a schematic diagram illustrating output (data display) of report data indicating the operating rate of each target management device according to an embodiment of the present invention.

DETAILED DESCRIPTION OF THE PREFERRED EMBODIMENTS

First Embodiment

<System Configuration>

Figure 1:
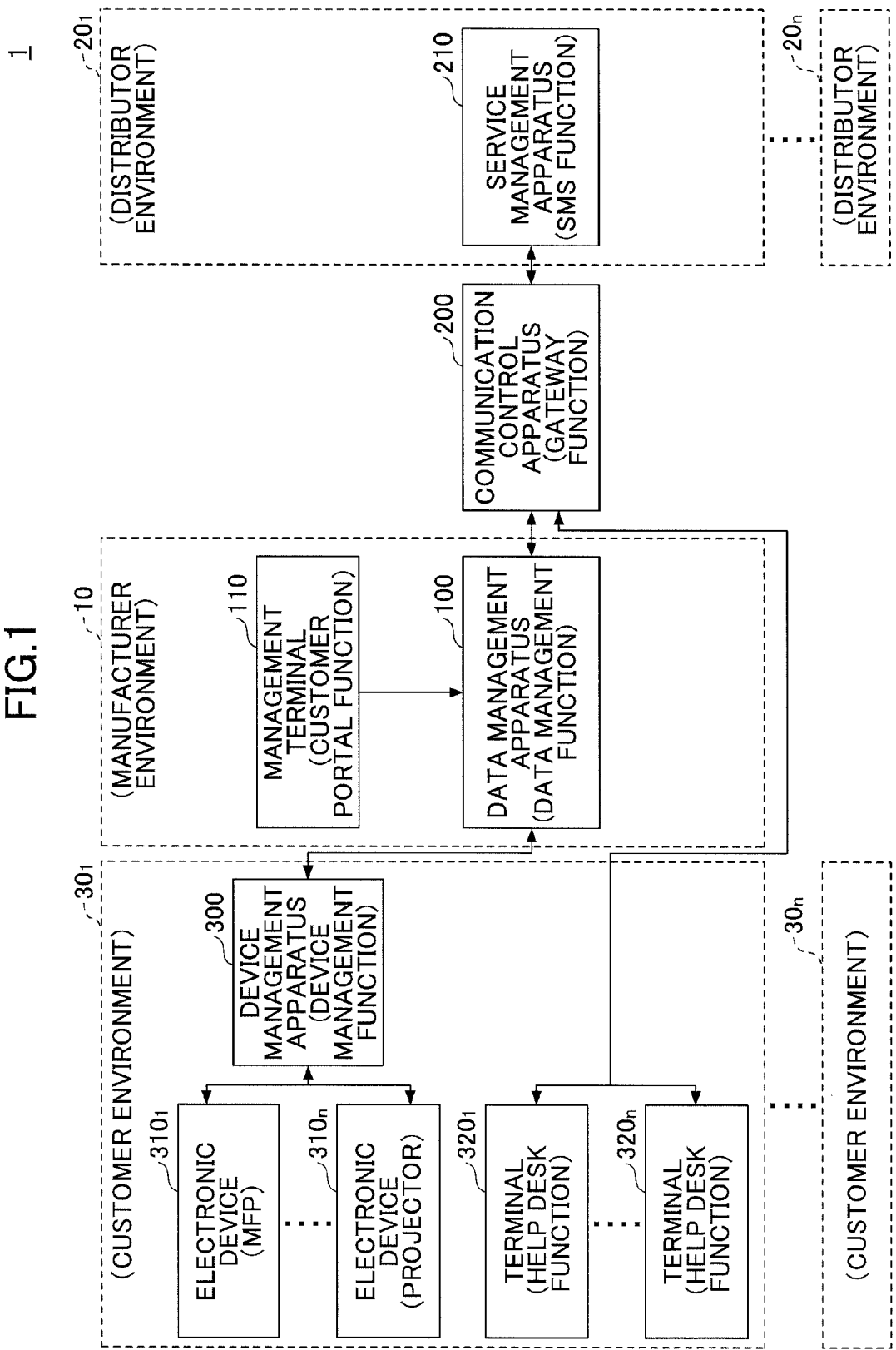
FIG. 1 is a schematic diagram illustrating an example of a configuration of a data management system according to an embodiment of the present invention.

FIG. 1 is a schematic diagram illustrating an example of a configuration of a data management system 1 according to an embodiment of the present invention.

As illustrated in FIG. 1, the data management system 1 includes multiple customer environments $30_1$-$30_n$ (hereinafter also collectively referred to as "customer environment") and multiple distributor environments $20_1$-$20_n$ (hereinafter also collectively referred to as "distributor environment") that are connected to a manufacturer environment 10 by a network such as WAN (Wide Area Network).

The customer environment 30 is a network environment of the customer's side. For example, multiple electronic devices $310_1$-$310_n$ such as a MFP (Multi-Function Peripheral) or a projector (hereinafter also collectively referred to as "electronic device 310") and multiple terminals $320_1$-$320_n$ such as a PC (personal computer) (hereinafter also collectively referred to as "terminal 320") are connected to the customer environment 30. In this embodiment, the electronic device 310 corresponds to a "target management device", and the terminal 320 corresponds to a device having a help desk function for receiving inquiries from a customer.

A device management apparatus 300 is connected to the customer environment 30. The device management apparatus 300 includes a device management function. By using the device management function, the device management apparatus 300 monitors and manages the electronic device 310. In this embodiment, the device management function includes functions such as obtaining device data, detecting change of device status based on the device data, and externally notifying the change of device status based on the result of the detection.

The distributor environment 20 is a network environment of the distributor's side. The distributor environment is a network environment on the side of the distributor which responds to various request received from the customer. A service management apparatus 210 is connected to the distributor environment 20. The service management apparatus 210 includes a SMS (service management system) function. By using the SMS function, the service management apparatus 210 manages a response (service) to be performed in response to various requests received from the customer. In this embodiment, the device management function includes functions such as receiving of an external notification of a response request, assigning of a request response (assigning of a personnel of a service), and externally notifying completion of a request response.

The manufacturer environment is a network environment of the manufacturer's side. A data management apparatus 100 and a management terminal 110 are connected to the manufacturer environment. The data management apparatus 100 includes a data management function. By using the data management function, the data management apparatus 100 manages data pertaining to a request response (in response to a request from the customer) based on data notified by the device management apparatus 300 of each customer environment 30 or the service management apparatus 210 of each distributor environment 20. In this embodiment, the data management function includes functions such as receiving external notifications notifying a response request or completion of a request response (request response completion), recording (storing) of the status of a request response, gathering (totalizing) of data pertaining to the status of a request response (request response status), and outputting (visualization) of the status of a request response. Further, the management terminal 110 has a customer portal function. By using the customer portal function, the management terminal 110 proposes improvements to the customer based on the request response status and requests changes of the configuration of the electronic device 310 based on the proposal.

It is to be noted that the data management apparatus 100 of the manufacturer environment 10 and the service management apparatus 210 of each distributor environment 20 are connected to each other via the communication control apparatus 200. Further, the terminal 320 of each customer environment 30 and the service management apparatus 210 of each distributor environment 30 are connected to each other via the communication control apparatus 200. The communication control apparatus 200 includes a gateway function. By using the gateway function, the communication control apparatus 200 controls communications between the manufacturer environment 10 and the distributor environment 30. In this embodiment, the gateway function includes functions such as sorting of external notification transfer destinations and converting of transmission data according to the transfer destination.

Next, a device management service performed by the data management system 1 according to an embodiment of the present invention is described.

For example, in a case where there is an order for a consumable supply (consumable supply order) or request for responding (attending) to a malfunction (malfunction response request), the consumable supply order or the malfunction response request is notified from the device management apparatus 300 of the customer environment 30 to the data management apparatus 100 of the manufacturer environment and transferred to the service management apparatus 210 of the distributor environment 20 via the communication control apparatus 200. Then, after replacement, the replenishment of the consumable supply, or the recovery of the malfunction is completed, the completion is notified from the service management apparatus 210 of the distributor environment 20 to the data management apparatus 100 of the manufacturer environment 10 via the communication control apparatus 200. During a period between the notification of the request and the notification of the completion, the data management apparatus 100 records the history of the status of the response to the request for replacement/replenishment of the consumable supply or the request for fixing (recovering) the malfunction based on received notification data.

In a case where there is an inquiry (inquiry request) pertaining to the electronic device 310, the inquiry is notified from the terminal 320 of the customer environment 30 to the service management apparatus 210 of the distributor environment 20 via the communication control apparatus 200. Then, a reply to the inquiry is notified from the service management apparatus 210 of the distributor environment 20 to the terminal 320 of the customer environment 30 via the communication control apparatus 200. During a period between the notification of the inquiry and the notification of the reply, the data management apparatus 100 records the history of the status of the response to the inquiry (inquiry request) based on received notification data.

In a case where there is a request to change the configuration of the electronic device 310 (configuration change request), the request is notified from the management terminal 110 to the data management apparatus 100 in the manufacturer environment 10 and transferred to the service management apparatus 210 of the distributor environment 20 via the communication control apparatus 200. Then, after the change of the configuration of the electronic device 310 is completed, the completion is notified from the service management apparatus 210 of the distributor environment 20 to the data management apparatus 100 of the manufacturer environment 10 via the communication control apparatus 200. During a period between the notification of the configuration change request and the notification of the completion of the configuration change service (response), the data management apparatus 100 records the history (history data) of the status of the response to the configuration change request based on received notification data.

In the manufacturer environment, the status of responding to the requests (request response status) can be gathered (totalized) based on the history data recorded by the data management apparatus 100. Further, a report of various data can be output (visualization) based on the gathered request response data. The report of the various data can be used for proposing improvement of the customer environment (customer environment improvement proposal). For example, the customer environment improvement proposal may be a proposal to optimize the use of the electronic device 310 in the customer environment 30.

With the above-described configuration of the data management system 1 according to an embodiment of the present invention, a device management service that enables integrated management of the electronic device 310 can be provided.

<Hardware Configuration>

Figure 2:
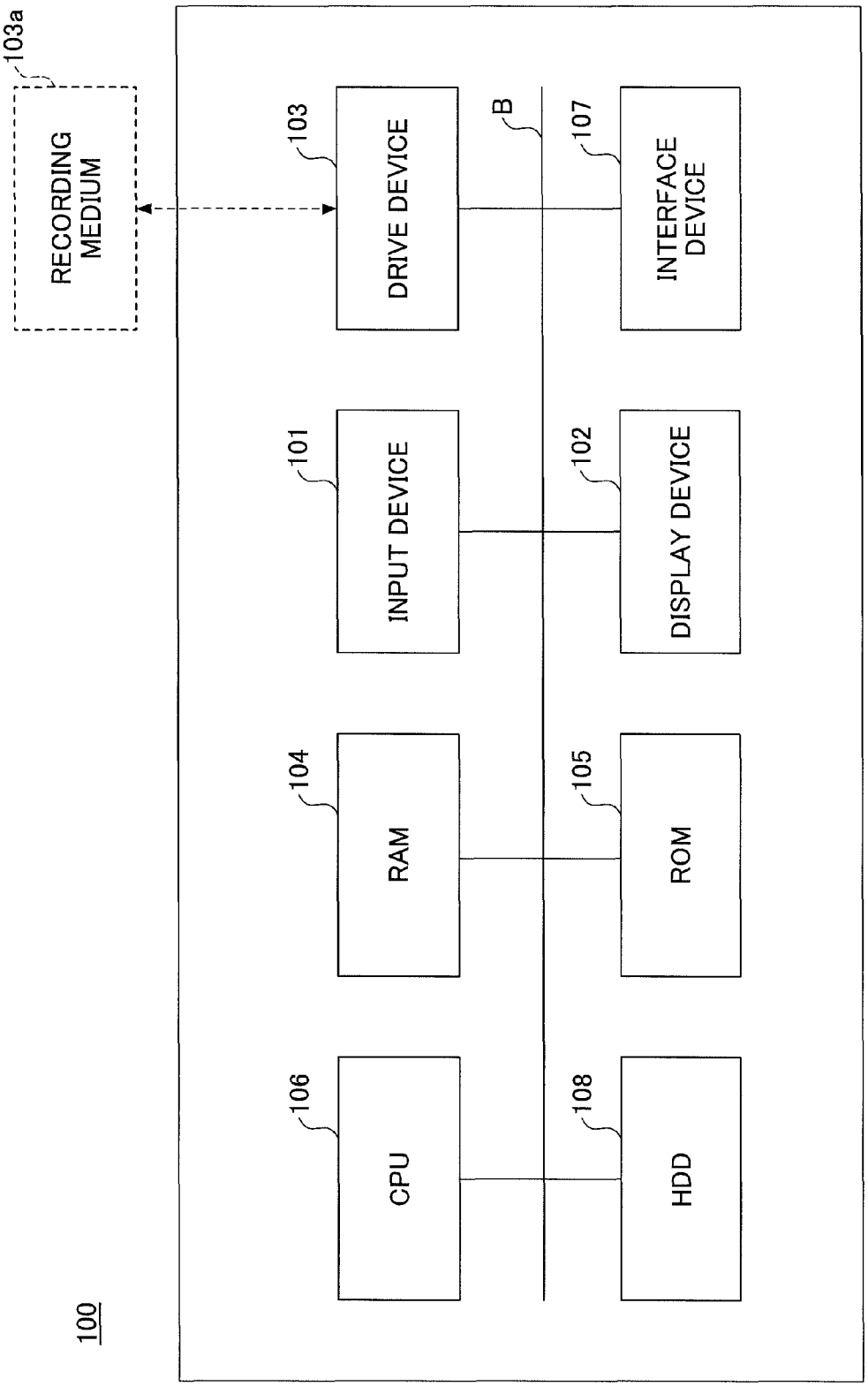
FIG. 2 is a schematic diagram illustrating a hardware configuration of a data management apparatus according to an embodiment of the present invention.

FIG. 2 is a schematic diagram illustrating a hardware configuration of the data management apparatus 100 according to an embodiment of the present invention. It is to be noted that the management terminal 110, the communication control apparatus 200, the service management apparatus 210, the device management apparatus 300, and the terminal 320 included in the data management apparatus 100 have substantially the same hardware configuration as the below-described hardware configuration of the data management apparatus 100. Accordingly, the hardware configuration of the data management apparatus 100 is described, and description of the hardware configuration of the management terminal 110, the communication control apparatus 200, the service management apparatus 210, the device management apparatus 300, and the terminal 320 is omitted.

As illustrated in FIG. 2, the data management apparatus 100 includes, for example, an input device 101, a display device 102, a drive device 103, a RAM (Random Access Memory) 104, a ROM (Read Only Memory) 105, a CPU (Central Processing Unit) 106, an interface device 107, and a HDD (Hard Disk Drive) 108 that are connected to each other by a bus B.

The input device 101 includes, for example, a keyboard or a mouse. The input device 101 is used for inputting control (operation) signals to the data management apparatus 100. The display device 102 includes a display. The display device 102 is used for displaying results of processes performed by the data management apparatus 100.

The interface device 107 is an interface for connecting the data management apparatus 100 to a network. The data management apparatus 100 can perform data communications between other apparatuses having a communication function by way of the interface device 107.

The HDD 108 is a non-volatile storage device for storing programs and data. The programs and data include, for example, basic software for an OS (Operating System) such as Windows (registered trademark) or UNIX (registered trademark) and applications for providing various functions in a system. Further, the HDD 108 manages the programs and data by using a predetermined file system and/or a DB (Data Base).

The drive device 103 is an interface between the data management apparatus 100 and a detachable computer-readable recording medium 103a. The data management apparatus 100 can read data from and/or write data to the recording medium 103a via the drive device 103. The recording medium 103a may be, for example, a floppy disk (registered trademark), a CD (Compact Disk), a DVD (Digital Versatile Disk), a SD (Secure Digital) memory card, or a USB (Universal Serial Bus) memory.

The ROM 105 is a non-volatile semiconductor memory (storage device) that can store internal data even after the power of the data management apparatus 100 is turned off. The ROM 105 may store data and programs used for, for example, execution of the BIOS (Basic Input/Output System) upon activation of the data management apparatus 100, setting of a data process system, or setting of a network. The RAM 104 is a volatile semiconductor memory (storage device) that temporarily stores programs and data. The CPU 106 is an arithmetic unit (processor) that controls the entire data management apparatus 100 and performs the functions of the data management apparatus 100 by loading programs and data read from the above-described storage devices (e.g., HDD 108, ROM 105) to the RAM 104 and executing various processes.

With the above-described hardware configuration of the data management apparatus 100 according to an embodiment of the present invention, the data management apparatus 100 can provide various data processing services.

<Data Management Function>

Next, a data management function according to an embodiment of the present invention is described.

In the data management system 1 according to an embodiment of the present invention, in a case where a predetermined response request notification from a customer is received, the response request notification is recorded. Then, the data management system 1 identifies a distributor for executing the request response based on the customer that has provided the response request. Then, the data management system 1 notifies the response request to the identified distributor. Then, when the data management system 1 receives a notification notifying the completion of the request response from the distributor, the data management system 1 records the received completion notification. Then, the data management system 1 gathers the request response status of the electronic device 310 by referring to the history of the recorded request response status (gathering of customer response status). Then, the data management system 1 outputs a response to be used for proposing improvement of the customer environment 30 based on the gathered request response status. Thereby, the data management system 1 can provide a data management function.

In a device management service according to a related art example, there are functions that are automated and functions that are not automated. Therefore, the device management service according to the related art example may lack qualities in terms of, for example, accuracy and rapidness. Thus, the device management service according to the related art example is unable to provide high quality services.

Accordingly, with the data management system 1 according to an embodiment of the present invention, when a response request is received from a customer, the data management system 1 identifies a distributor for executing the request response based on the customer that has provided the response request, instructs the distributor to execute the request response, integrates data pertaining to the response requests notified by the distributor or the customer, manages the integrated data, dynamically gathers data of the status of the request response of the electronic device 310, and outputs the gathered status data.

Accordingly, the data management system 1 provides a device management service in which data management of the electronic device 310 is automated. Accordingly, the data management system 1 according to an embodiment of the present invention can provide a high quality device management service.

Next, a configuration and operation of a data management function according to an embodiment of the present invention are described.

FIG. 3 is a schematic diagram illustrating a configuration of functions (function units) according to an embodiment of the present invention.

As illustrated in FIG. 3, the data management function according to an embodiment of the present invention is executed by cooperative operations performed by each of the below-described function units included in the data management system 100, the management terminal 110, the communication control apparatus 200, the service management apparatus 210, the device management apparatus 300, and the terminal 320.

The data management apparatus 100 includes, for example, a data transmission/reception unit 11, a data management unit 12, and a report generation unit 13. The management terminal 110 includes, for example, a data transmission/reception unit 111.

The communication control apparatus 200 includes, for example, a data transmission/reception unit 21, a response destination identifying unit 22, and a data conversion unit 23. The service management apparatus 210 includes, for example, a data transmission/reception unit 211.

The device management apparatus 300 includes, for example, a device data obtaining unit 301, a detecting unit 302, and a data transmission unit 303. The terminal 320 includes, for example, a data transmission/reception unit 321.

<<Management Terminal>>

The data transmission/reception unit 111 is a function unit that performs data communications (transmission/reception) between the management terminal 110 and an external apparatus. The data transmission/reception unit 111 notifies a request for changing a configuration of the electronic device 310 (configuration change request) by transmitting configuration change data to the data management apparatus 100. The configuration change data is input data pertaining to the changing of the configuration of the electronic device 310 in the customer environment. The changing of the configuration of the electronic device 310 may be, for example, introducing a new electronic device 310, transferring an electronic device 310, replacing the electronic device 310, or removing the electronic device 310. Further, the data transmission/reception unit 111 receives the result of changing the configuration of the electronic device 13 by receiving a notification data of request response completion (completion of service of changing the configuration of the electronic device 310) (hereinafter also referred to as "configuration change response result data") from the data management apparatus 100.

Thereby, the personnel of the manufacturer can confirm the change of configuration of the electronic device 310 in the customer environment 30 by way of a screen of the management terminal 110. It is to be noted that the data transmission/reception unit 111 performs data transmission/reception between the data management apparatus 100 based on a network setting value (e.g., IP (Internet Protocol) address) of an external apparatus which is stored beforehand in the management terminal 111.

<<Device Management Apparatus>>

The device data obtaining unit 310 is a function unit that obtains device data of the electronic device 310. For example, the device data obtaining unit 301 periodically requests for the device data of the electronic device 310 to the electronic device 310 (obtaining request) and obtains the device data which includes a device status value. The device data obtaining unit 301 stores the obtained device data in a predetermined storage space of the storage device (e.g., HDD) of the device management apparatus 300. The device data obtaining unit 301 requests for the device data based on a network setting value (e.g., IP address) of the electronic device 310 which is stored beforehand in the device management apparatus 300.

The detecting unit 302 is a function unit that detects a change in the status of the electronic device 310 (device status change). The detection unit 302 detects a change in the status of the electronic device 310 based on a device status value in the device data obtained by the device data obtaining unit 301. The device status change includes, for example, a change in the consumable supplies of the electronic device 310 required to be ordered or occurrence of a malfunction in the electronic device 310. In a case where a response request is necessary based on the detection results, the detecting unit 302 notifies an external apparatus that a response request is necessary.

The data transmission unit 303 is a function unit that transmits data from the device management apparatus 300 to an external apparatus. The data transmission unit 303 notifies a SC (Service Call) request by transmitting data pertaining to a service call (service call data) to the device management apparatus 100. The service call data is generated in accordance with a request from the detecting unit 302. The service call data includes, for example, an identifier of a consumable supply required to be ordered (hereinafter also referred to as "consumable supply identifier (ID)") or an identifier of a malfunction occurring in the electronic device 310 (hereinafter also referred to as "malfunction identifier (ID)"). It is to be noted that the data transmission unit 303 transmits data to the data management apparatus 100 based on a network setting value (e.g., IP address) of an external apparatus which is stored beforehand in the device management apparatus 300.

In the above-described embodiment, the device management apparatus 300 obtains device data by using a polling process in which the device management apparatus 300 actively obtains device data periodically. However, the device management apparatus 300 may obtain device data by using other methods. For example, the device management apparatus 300 may obtain device data by using a trap process in which the device management apparatus 300 passively obtains device data. In the case of using the trap process, the device management apparatus 300 actively receives device data from the electronic device 310 when a status change occurs in the electronic device 310. In other words, the device management apparatus 300 can obtain device data without having to request obtaining of device data to the electronic device 310.

In the case of using the polling process, status change of the electronic device 310 can be periodically monitored. However, because data communications between the electronic device 310 and the device management apparatus 300 is performed periodically, the data communications may generate a large communication load. In contrast, by using the trap process, the communication load can be reduced. However, there is a time lag from the time of detecting status change of the electronic device 310 because the status of the electronic device 310 is not periodically monitored.

Accordingly, it is preferable for the device data obtaining unit 301 to provide an optimum data obtaining function by taking various conditions into consideration (e.g., number of electronic devices 310, communication status of the customer environment 30).

<<Terminal>>

The data transmission/reception unit 321 is a function unit that performs data transmission/reception between the terminal 320 and an external apparatus. The data transmission/reception unit 321 notifies an inquiry (inquiry request) by transmitting predetermined data to the communication control apparatus 200. The predetermined data includes, for example, an identifier of an inquiry type (hereinafter also referred to as "inquiry type identifier (ID)") or input data (inquiry content) inquiring about the electronic device 310 (hereinafter also referred to as "inquiry data"). Further, the data transmission/reception unit 321 receives a result of an inquiry request response by receiving notification data notifying completion of a request response (hereinafter also referred to as "inquiry response result data") from the communication control apparatus 200.

Thereby, the customer that has made the inquiry can confirm the content of a response (responsive to the inquiry) from the personnel of the distributor by way of a screen of the terminal 320. The data transmission/reception unit 312 transmits/receives data communicated between the communication control apparatus 200 based on, for example, a network setting value (e.g., IP address) of an external apparatus which is stored beforehand in the terminal 320.

<<Data Management Apparatus>>

The data transmission/reception unit 11 is a function unit that receives/transmits data between the data management apparatus 100 and an external apparatus. The data transmission/reception unit 11 transfers a configuration change request by transmitting configuration change data received from the management terminal 110 to the communication control apparatus 200. Further, the data transmission/reception unit 11 transfers a result of a configuration change request response by transmitting configuration change response result data received from the communication control apparatus 200 to the management terminal 11.

Thereby, in this embodiment, a notification notifying a configuration change request or completion of a request response is exchanged between the manufacturer environment 10 and the communication control apparatus 200.

The data transmission/reception unit 11 transfers an SC (Service Call) request by transmitting SC data received from the device management apparatus 300 to the communication control apparatus 200. Further, the data transmission/reception unit 11 receives a result of a request response by receiving SC notification response result data (i.e. data indicating completion of a SC request response (e.g., completion of a service such as replacement or replenishment of consumable supplies or recovery of a malfunction)) transmitted from the communication control apparatus 200.

Thereby, in this embodiment, a notification notifying a SC request or completion of a request response is exchanged between the customer environment 30, the manufacturer environment 10, and the communication control apparatus 200.

The data transmission/reception unit 11 receives an inquiry request by receiving inquiry data transmitted from the terminal 320 by way of the communication control apparatus 200. Further, the data transmission/reception unit 11 receives a result of an inquiry request response by receiving inquiry response result data transmitted from the communication control apparatus 200.

Thereby, the data transmission/reception unit 11 relays data between the management terminal 110, the device management apparatus 300, the terminal 320 and the communication control apparatus 200. The data transmission/reception unit 11 transmits/receives data communicated between the management terminal 110, the device management apparatus 300, the terminal 320, and the communication control apparatus 200 based on, for example, a network setting value (e.g., IP address) of an external apparatus which is stored beforehand in the data management apparatus 100.

The data management unit (history management unit) 12 is a function unit that manages history data of a response status corresponding to various requests. The data management unit 12 records history data of a status of a response corresponding to various requests (request response status) based on data transmitted/received by the data transmission/reception unit 11. The history data of the request response status is managed by using the below-described data.

FIG. 4 is a schematic diagram illustrating examples of data included in management data 90D according to an embodiment of the present invention. As illustrated in FIG. 4, history data of the request response status is managed with the management data 90D including a data set having data items associated to each other. The associated data items included in the management data 90D may be, for example, history ID data, type data, specific type data, device type data, response status data, and date/time data.

The item "history ID" includes data that identifies a history record of a request response status (hereinafter also referred to as "history identification data"). The value of the item "history ID" may be, for example, a history identifier that is uniquely issued upon recording of history data. In FIG. 4, numbers are assigned to the history ID based on the order in which history data is recorded.

The item "type" includes data that indicates the type of request (hereinafter also referred to as "type data"). The value of the item "type" may be, for example, a type value of a request. In FIG. 4, the names of the type of request (character string value) such as "SC", "configuration change", "inquiry" are included in the item "type".

The item "specific type" includes data that indicates the specific type of request (hereinafter also referred to as "specific type data"). The value of the item "specific type" may be, for example, a specific type value of a request. In FIG. 4, the names of the specific type of request (character string value) such as "out of paper", "out of xx toner", "transfer of device", or "xx inquiry" are included in the item "specific type".

The item "device type (device ID)" includes data that identifies the electronic device 310 requests for response (hereinafter also referred to as "device identification data"). The value of the item "device type" may be, for example, a device identifier uniquely assigned to each electronic device 310. In FIG. 4, a device ID (e.g., "MFP xxx", "PJ xxx") which is set, for example, when the electronic device 310 is introduced to a given environment.

The item "response status" includes data that indicates the status of a response responsive to a request (hereinafter also referred to as "response status data"). The value of the item "response status" may be, for example, a response status value of a request. In FIG. 4, the names of a response status (character string value) such as "requesting" or "complete" are included in the item "response status".

The item "date/time" includes data that indicates the date and time of the request or the date and time of the response (hereinafter also referred to as "history recording time/date"). The value of the item "date/time" may be, for example, the value of the date and time of the request or the value of the date and time of the response (time and date of recording history). In FIG. 4, the date value "2011/04/01" and the time value "xx:xx" are included in the item "date/time".

The management data 90D is stored in the management data storage unit 90. It is to be noted that the management data storage unit 90 corresponds to a predetermined storage space of a storage device (e.g., HDD) included in the data management apparatus 100.

Returning to the description of FIG. 3, the data management unit 12 records the history of the request response status. For example, the data management unit 12 records the history of the request response status by accessing the management data storage unit 90, referring to the management data 90D, and adding a new data set to the management data storage unit 90 when various data are received by the data transmission/reception unit 11.

For example, in a case where the data transmission/reception unit 11 receives a response request data "SC" including request type data "SC", specific type data "out of paper", device type (ID) data "MFP 001", and response status data "requesting", the data management unit 12 performs the below-described data processing (data manipulation) on the management data 90D.

In the case where the response request data "SC" is received, an ID "1" is added as the value of the item "history ID". Accordingly, a data space for recording a new response status history corresponding to the response request "SC" is generated. Then, the data management unit 12 records the current date and time "2011/04//01 13:00" as the value of the item "date/time" corresponding to the item [history ID]. The current date and time may be obtained from, for example, a time circuit (not illustrated) included in the data management apparatus 100.

Further, the data management unit 12 records data contained in the response request data "SC" such as type data "SC" and specific type data "out of paper" as the value of the item "type" and the value of the item "specific type" in correspondence with the item "history ID". Likewise, the data management unit 12 also records the device type (ID) "MFP 001" contained in the response request data "SC" as the value of the item "device type" in correspondence with the item "history ID". Likewise, the data management unit 12 also records the response status "requesting" as the value of the item "response status" (value of response status responsive to the request) contained in the response request data "SC" in correspondence with the item "history ID".

Accordingly, a new data set (indicated with reference numeral "R1" in FIG. 4) is added to the management data 90D and the response status of the received SC request (requesting state) is recorded in the management data 90D.

Next, in a case where the data transmission/reception unit 11 receives a response result data "SC" including request type data "SC", specific type data "out of paper", device type (ID) data "MFP 001", and response status data "complete", the data management unit 12 performs the below-described data processing (data manipulation) on the management data 90D.

In the case where the response result data "SC" is received, an ID "5" is added as the value of the item "history ID". Accordingly, a data space for recording a new response status history corresponding to the response request "SC" is generated. Then, the data management unit 12 records the current date and time "2011/04//01 13:15" as the value of the item "date/time" corresponding to the item [history ID]. The current date and time may be obtained from, for example, a time circuit (not illustrated) included in the data management apparatus 100.

Further, the data management unit 12 records data contained in the response result data "SC" such as type data "SC" and specific type data "out of paper" as the value of the item "type" and the value of the item "specific type" in association with the item "history ID". Likewise, the data management unit 12 also records the device type (ID) "MFP 001" contained in the response result data "SC" as the value of the item "device type" in association with the item "history ID". Likewise, the data management unit 12 also records the response status "complete" contained in the response result data "SC" as the value of the item "response status" in association with the item "history ID".

Accordingly, a new data set (indicated with reference numeral "R2" in FIG. 4) is added to the management data 90D and the response status of the completed SC request (completed state) is recorded in the management data 90D.

The data management unit 12 also records the request response status for a configuration change request or an inquiry request by performing data manipulation (adding of new data set) in the same manner as the above-described data manipulation for recording the history of the SC request response. It is to be noted that configuration change data, configuration change response result data, inquiry data, and inquiry response result data also include, for example, request type data, specific type data, device type (ID) data, and response status data. Thus, the data management unit 12 performs the above-described data manipulation and records data in the management data 90D based on the included data.

Accordingly, a series of response status history data (reference numerals R1 and R2 in FIG. 4) during a period between receiving of the response request and receiving of a response result responsive to the response request are recorded and managed by the data management apparatus 100. That is, a set of data including a combination of data pertaining to a response request and data pertaining to a response result associated to the response request is managed by the data management unit 12.

In addition to the above-described data manipulation, the data management unit 12 also performs data manipulation on the management data 90D such as searching of data, referring to data, obtaining data based on the values of the data items in the management data 90D. The data management unit 12 also deletes (erases) data from the management data 90D in units of data sets based values of the date item [history ID].

The report generation unit 13 is a function unit that generates report data in compliance to a predetermined format (data specification) based on the management data 90D. For example, the report generation unit 13 refers to the management data 90D by way of the data management unit 12. Then, the report generation unit 13 gathers the response request status of the electronic device 310 (gathers customer response status) based on the recorded history data of the request response status. Then, the report generation unit 13 generates report data based on the gathered response request status. It is to be noted that the method of gathering the response request status differs depending on how the generated report data is to be used.

For example, when using report data in a case of proposing device replacement for the purpose of improving productivity (availability) of the electronic device 310, the number of times of transmitting the response request pertaining to the electronic device during a predetermined period (frequency of the response request) is gathered based on the management data 90D and report data is generated based on the gathered result. Accordingly, an electronic device 310 having the most number of times of transmitting the response request can be extracted (visualized) from plural electronic devices 310 introduced to the customer environment 30. Thereby, device replacement can be appropriately proposed.

Further, when using report data in a case of proposing improvement of rapidness for the purpose of improving response quality in response to various requests transmitted from the customer environment 30, a completion period between receiving of the response request and completion of the response is calculated based on the management data 90D (date/time data), data pertaining to the completion period of various requests are gathered, and report data is generated based on the gathered result. Accordingly, a request having a long completion period can be extracted (visualized) from plural requests transmitted from the customer environment. Thereby, improvement of rapidness can be appropriately proposed.

<<Communication Control Apparatus>>

The data transmission/reception unit 21 is a function unit that transmits/receives data between the communication control apparatus 200 and an external apparatus. The data transmission/reception unit 21 transfers a configuration change request by transmitting configuration change data transmitted from the data management apparatus 100 to the service management apparatus 210. Further, the data transmission/reception unit 11 transfers a result of a response responsive to the configuration change request (configuration change request response) by transmitting a response completion notification (data notifying completion of the request response) transmitted from the service management apparatus 210 to the data management apparatus 100.

Accordingly, in this embodiment, the configuration change request and the response completion notification are exchanged between the manufacturer environment 10 and the distributor environment 20.

The data transmission/reception unit 21 transfers a SC request by transmitting SC data transmitted from the data management apparatus 100 to the service management apparatus 210. Further, the data transmission/reception unit 21 transfers a result of a SC request response by transmitting SC response result data transmitted from the service management apparatus 210 to the data management apparatus 100.

Accordingly, in this embodiment, the SC request and response completion notification are exchanged between the manufacturer environment 10 and the distributor environment 20.

The data transmission/reception unit 21 transfers an inquiry request by transmitting inquiry data transmitted from the terminal 320 to the data management apparatus 100 and the service management apparatus 210. Further, the data transmission/reception unit 21 transfers a result of a response responsive to the inquiry request (inquiry request response) by transmitting inquiry response result data transmitted from the service management apparatus 210 to the data management apparatus 100 and the terminal 320.

Accordingly, in this embodiment, the inquiry request and a reply to the inquiry request are exchanged between the customer environment 30, the manufacturer environment 10, and the distributor environment 20.

The data transmission/reception unit 21 relays data between the terminal 320, the data management apparatus 100, and the service management apparatus 210. That is, the data transmission/reception unit 21 controls data communication between the manufacturer environment 10 and the distributor environment 20. It is to be noted that the data transmission/reception unit 21 performs data transmission/reception between the terminal 320, the data management apparatus 100, and the service management apparatus 210 based on a network setting value (e.g., IP address) of an external apparatus which is stored beforehand in the communication control apparatus 200.

The response destination identifying unit (transmission destination identifying unit) 22 is a function unit that identifies a distributor which is to perform a request response based on the customer requesting the response. In a case where the data transmission/reception unit 21 receives inquiry data from the terminal 320 or receives configuration change data or SC data from the data management apparatus 100, the response destination identifying unit 22 identifies the distributor (response destination) which is to perform a request response by identifying the service management apparatus 210 to which the received data (i.e. configuration change data/SC data/inquiry data) is to be transferred. For example, the response destination identifying unit 22 identifies the service management apparatus 210 (destination to which the received data is to be transferred) based on control data 80D illustrated in FIG. 5.

FIG. 5 is a schematic diagram illustrating an example of a configuration of the control data 80D according to an embodiment of the present invention.

As illustrated in FIG. 5, a relationship between a customer and a distributor which is to perform a response requested by the customer is managed by a data set including data items such as "customer ID" and "response destination ID".

The item "customer ID" includes data that identifies the customer environment 30 (hereinafter also referred to as "customer ID data"). The value of the item "customer ID data" may be, for example, a customer identifier that is uniquely assigned to the customer environment 30. In FIG. 5, a customer ID "Uxxx" assigned at the time of concluding a contract may be included in the customer ID data.

The item "response destination ID" includes data that identifies the service management apparatus 210 installed in the distributor environment 20 (hereinafter also referred to as "response destination ID data"). The value of the item "response destination ID" may be, for example, a device identifier uniquely assigned to the service management apparatus 210. In FIG. 5, a device ID "SMSxxx" assigned at the time of installing the service management apparatus 210 may be included in the device ID.

The control data 80D is stored in the control data storage unit 80. It is to be noted that the control data storage unit 80 corresponds to a predetermined storage space of a storage device (e.g., HDD) of the communication control apparatus 200. Further, the control data 80D is also managed by adding/deleting data in units of data sets at the time of, for example, concluding a contract or terminating a contract.

Returning to the description of FIG. 3, the response destination identifying unit 22 identifies the service management apparatus 210 corresponding to the destination to which a response request is to be transferred. For example, when various data are received by the data transmission/reception unit 21, the response destination identifying unit 22 identifies the service management apparatus 210 by accessing the control data storage unit 80 and referring to the control data 80D. It is to be noted that the data transmission/reception unit 21 receives the customer ID data together with configuration change data/SC data/inquiry data from the data management apparatus 100 or the terminal 320.

For example, in a case where the data transmission/reception unit 21 receives the customer ID data "U001", the response destination identifying unit 22 identifies the service management apparatus 210 based on the control data 80D as described below.

First, the response destination identifying unit 22 refers to the item "customer ID" of the control data 80D and identifies a data set having an item value matching an item value of a received customer identification data. Then, based on a value of the item "response destination ID] included in the identified data set, the response destination identifying unit 22 identifies a corresponding service management apparatus 210 to which a device ID "SMS001" is set.

Accordingly, the communication control apparatus 200 identifies the distributor (response destination) which performs the request response, transfers various data received from the terminal 320 or the data management apparatus 100, and notifies the response request.

The data conversion unit 23 is a function unit that converts transmitted data/received data between the communication control apparatus 200 and an external apparatus. The data conversion unit 23 converts data exchanged between the terminal 320, the data management apparatus 100, and the service management apparatus 210.

An SMS function of the service management apparatus 210 differs depending on the data specification used by a function in the distributor environment 20. Therefore, the data exchanged between the terminal 320, the data management apparatus 100, and the service management apparatus 210 may need to be converted. Thus, the data conversion unit 23 performs data conversion when transmitting/receiving data as described below.

The data conversion unit 23 converts reception data received from the terminal or the data management apparatus 100 (e.g., configuration change data/SC data/inquiry data) into transmission data complying to a data specification of the SMS function of the service management apparatus 210 identified by the response destination identifying unit 22. As a result, the data transmission/reception unit 21 transmits converted data to the service management apparatus 210.

On the other hand, the data conversion unit 23 converts reception data received from the service management apparatus 210 (e.g., configuration change response result data/SC response result data, inquiry response result data) into transmission data complying to a data specification of a help desk function of the terminal 320 or a integrating function of the data management apparatus 100. As a result, the data transmission/reception unit 21 transmits converted data to the terminal 320 or the data management apparatus 100.

<<Service Management Apparatus>>

The data transmission/reception unit 211 is a function unit that transmits/receives data between the service management apparatus 210 and an external apparatus. The data transmission/reception unit 211 receives a configuration change request by receiving configuration change data from the communication control apparatus 200. Thereby, the service management apparatus 210 assigns a person or personnel which are to respond to the configuration change request of the received configuration change request data. Then, the data transmission/reception unit 211 notifies the result of the configuration change request response by transmitting configuration change response result data based on a service report reported by the personnel that has performed the request response.

The data transmission/reception unit 211 receives a SC request by receiving SC data from the communication control apparatus 200. Thereby, the service management apparatus 210 assigns a person or personnel which are to respond to the SC request of the received SC data. Then, the data transmission/reception unit 211 notifies the result of the SC request response by transmitting SC response result data based on a service report reported by the personnel that has performed the request response.

The data transmission/reception unit 211 receives an inquiry request by receiving inquiry data from the communication control apparatus 200. Thereby, the service management apparatus 210 assigns a person or personnel which are to respond to the inquiry request of the received inquiry data. Then, the data transmission/reception unit 211 notifies the result of the inquiry request response by transmitting inquiry response result data based on a service report reported by the personnel that has performed the request response.

Accordingly, a response responsive to a request from a customer and a notification indicating a result of the response are performed as a series of services. It is to be noted that the data transmission/reception unit 211 performs data transmission/reception between the data management apparatus 100 and the service management apparatus 210 based on a network setting value (e.g., IP address) of an external apparatus which is stored beforehand in the communication control apparatus 200.

Further, the data transmitted/received by the data transmission/reception unit 211 is recorded in the service record data storage unit 70. Accordingly, response services corresponding to requests from the customer are managed in the service management apparatus 210. It is to be noted that the service record data storage unit 70 corresponds to a predetermined storage space of a storage device (e.g., HDD) of the service management apparatus 210.

Hence, the data management function according to an embodiment of the present invention can be performed by cooperatively operating the function units of, for example, the data management apparatus 100, the communication control apparatus 200, the service management apparatus 210, and the terminal 320 in the data management system 1.

Next, a detailed operation (cooperative operation of group of function units) of the data management function according to an embodiment of the present invention is described with reference to the following sequence diagrams and flowchart.

<<Operation of Updating Management Data in a Case of Receiving SC Request from Electronic Device>>

Figure 6:
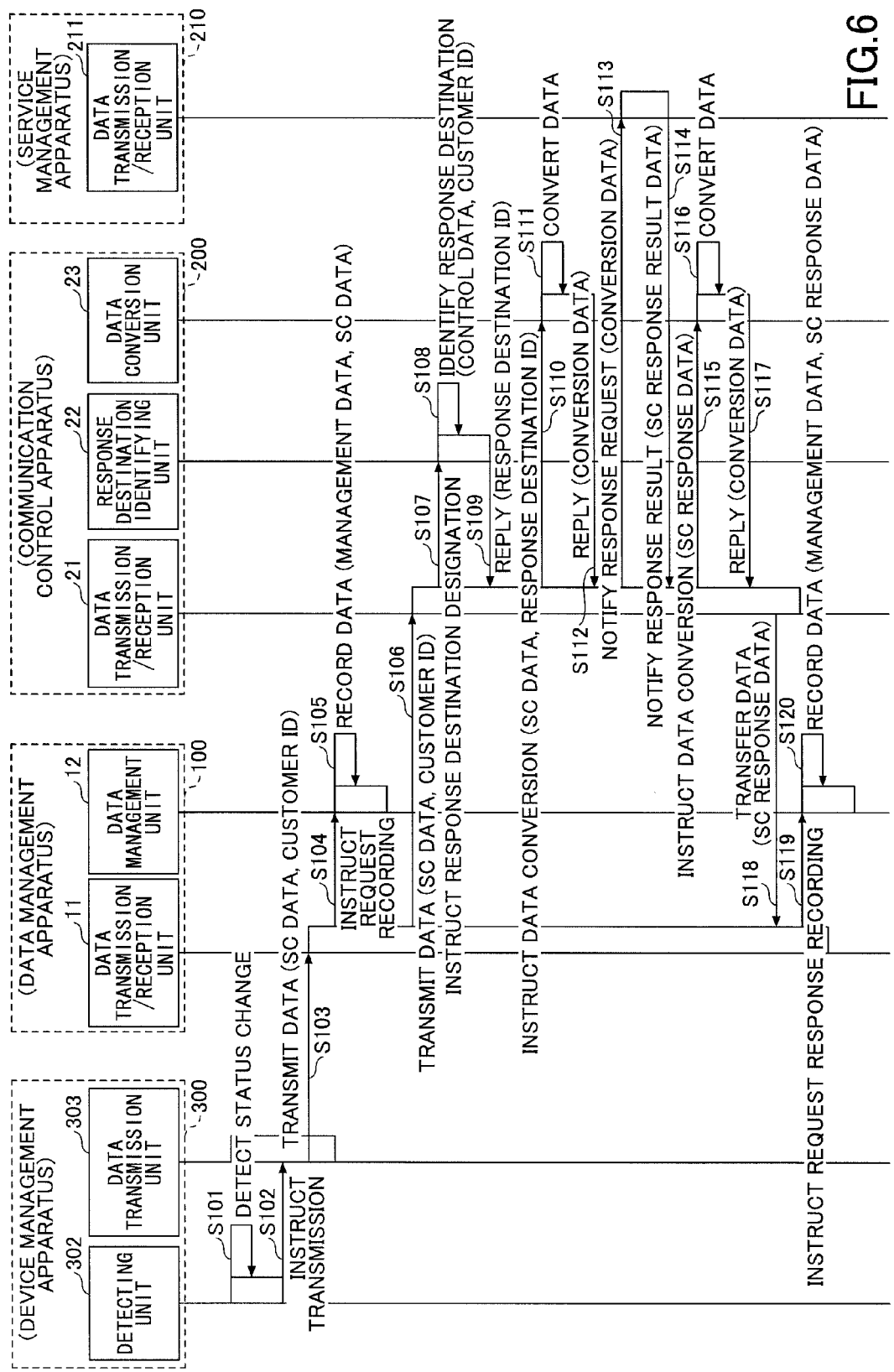
FIG. 6 is a sequence diagram illustrating an operation of updating management data (part 1) according to an embodiment of the present invention.

FIG. 6 is a sequence diagram illustrating an operation of updating management data 90D (part 1) according to an embodiment of the present invention.

As illustrated in FIG. 6, the device management apparatus 300 detects status change (generation of SC) of an electronic device 310 (target management device) by using the detecting unit 302 (Step S101). Then, the device management apparatus 30 instructs the data transmission/reception unit 303 to transmit SC data to the data management apparatus 100 (Step S102).

The device management apparatus 300 notifies the SC request to the data management apparatus 100 by transmitting SC data from the data transmission unit 303 to the data management apparatus 100 (Step S103). In Step S103, the data transmission unit 303 transmits customer ID data together with the SC data to the data management apparatus 100.

The data management apparatus 100 receives the SC request by receiving the SC data transmitted from the device management apparatus 300 with the data transmission/reception unit 11. Further, the data management apparatus 100 instructs the data management unit 12 to record the received SC request (Step S104). In Step S104, the data transmission/reception unit 11 provides the SC data to the data management unit 12 and instructs the data management unit 12 to record the SC request.

In response to the SC request, the data management apparatus 100, by using the data management unit 12, accesses the management data storage unit 90, refers to the management data 90D, adds a new data space (data set) corresponding to the request, and records values to corresponding data items of the management data 90D based on the SC data (Step S105).

More specifically, the data management unit 12 adds an ID (which is issued when the data transmission/reception unit 11 receives the SC data) to the value of the item "history ID" and generates a data space to which a new response status history of the SC request is recorded. Then, the data management unit 12 records the current date and time to the value of the item "date/time" in association with the item "history ID".

Further, the data management unit 12 records an SC request type and a specific type included in the received SC data to the value of the item "type" and the item "specific type" in association with the item "history ID". Further, the data management unit 12 records a device identifier of the electronic device 310 (completed response device) included in the received response result data to the value of the item "device type (ID)" in association with the item "history ID". Further, the data management unit 12 records a response status value included in the received SC response result data to the value of the item "response status" in association with the item "history ID".

Accordingly, a new data set of the received SC request is added to the management data 90D, and a response status in response to the most recent SC request (requesting state) is recorded. Then, the data management apparatus 100 notifies the inquiry request to the communication control apparatus 200 by transferring the SC data to the communication control apparatus 200 by using the data transmission/reception unit 11 (Step S106). In Step S106, the data transmission/reception unit 11 transfers the customer ID data together with the SC data.

The communication control apparatus 200 receives the SC request by receiving the SC data transmitted from the data management apparatus 100 by using the data transmission/reception unit 21. Then, the communication control apparatus 200 instructs the response destination identifying unit 22 to identify the response destination (distributor) of the received SC data (Step S107). In Step S107, the data transmission/reception unit 21 instructs the response destination identifying unit 22 to identify the response destination by providing the received customer identification data together with the SC data to the response destination identifying unit 22.

In response to the instruction from the data transmission/reception unit 21, the communication control apparatus 200 accesses the control data storage unit 80, refers to the control data 80D, and identifies the response destination (distributor) corresponding the received SC request based on the customer ID data by using the response destination identifying unit 22 (Step S108).

More specifically, the response destination identifying unit 22 refers to the control data 80D based on the received customer ID data and identifies the service management apparatus 210 which is to be the transfer destination of the SC data. The response destination identifying unit 22 refers to the item "customer ID" of the control data 80D and identifies a data set having an item value matching that of the received customer ID data. The response destination identifying unit 22 identifies the service management apparatus 210 (transfer destination of SC data) based on the value of the item "response destination ID" included in the identified data set.

The communication control apparatus 200 transmits a reply indicating the ID data of the distributor (response destination) identified by the response destination identifying unit 22 to the data transmission/reception unit 21 (Step S109). In Step S109, the response destination identifying unit 22 transmits a response indicating the response destination ID data included in the data set identified based on the customer identification data to the data transmission/reception unit 21.

Then, when the communication control apparatus 200 receives the response indicating the response destination, the communication control apparatus 200, by using the data transmission/reception unit 21, instructs the data conversion unit 23 to convert the SC request to a data specification complying with that of the response destination (Step S110). In Step S110, the data transmission/reception unit 21 sends the response destination ID data together with the received SC data to the data conversion unit 23 and instructs data conversion to the data conversion unit 23.

In response to the instruction from the data transmission/reception unit 21, the communication control apparatus 200, by using the data conversion unit 23, converts the SC data to data having a data specification (data specification of an SMS function) complying with the data specification of the service management apparatus 210 identified according to the response destination ID data (Step S111).

The communication control apparatus 200 replies to the data conversion instruction by sending the converted SC data converted by the data conversion unit 23 to the data transmission/reception unit 21 (Step S112).

Then, the communication control apparatus 200 notifies the SC request to the service management apparatus 210 by transferring the converted SC data to the service management 210 of the identified distributor by way of the data transmission/reception unit 21 (Step S113).

As a result, the data transmission/reception unit 211 of the service management apparatus 210 receives the SC request by receiving the converted SC data. Thereby, the SC request is assigned to the person or personnel of the distributor according to the SMS function. As a result, the person or personnel conducts a response service responsive to the SC request (e.g., ordering of consumable supplies, fixing of malfunction (failure)). In Step S113, the data transmission/reception unit 211 records the received SC request in the service record data storage unit 70 based on the received converted SC data. Then, after the person or personnel completes conducting the service responsive to the SC request, a service report by the person or personnel (response complete) is recorded in the service record data storage unit 70.

Then, the service management apparatus 210 notifies the result of the service (response) responsive to the SC request (SC request response) to the communication control apparatus 200 by transmitting an SC response result data based on the service report from the data transmission/reception unit 211 to the communication control apparatus 200 (Step S114).

Then, the communication control apparatus 200 receives the result of the SC request response by receiving the SC request response data transmitted from the service management apparatus 210 with the data transmission/reception unit 21. Thereby, the data transmission/reception unit 21 instructs the data conversion unit 23 to convert the result of the request response data to a data specification complying with the transfer destination (Step S115). In Step S115, the data transmission/reception unit 21 sends the received SC response result data to the data conversion unit 23 and instructs the data conversion unit 23 to perform data conversion.

Then, in response to the instruction from the data transmission/reception unit 21, the data conversion unit 23 converts the SC response result data to data having a data specification (data specification of an integrating function) complying with the data management apparatus 100 (transfer destination of the SC response result data) (Step S116).

Then, the communication control apparatus 200 replies to the data conversion instruction by sending the conversion data of the SC response result data (converted by the data conversion unit 23) to the data transmission/reception unit 21 (Step S117).

Then, the communication control apparatus 200 notifies the result of the SC request response to the data management apparatus 100 by transferring the converted data of the SC response result data from the data transmission/reception unit 21 to the data management apparatus 100 (Step S118).

Then, the data management apparatus 100 receives the result of the SC request response by receiving the SC response result data transmitted from the communication control apparatus 200 with the data transmission/reception unit 11. Then, the data transmission/reception unit 11 instructs the data management unit 12 to record the received SC response result data (Step S119). In Step S119, the data transmission/reception unit 11 sends the received SC response result data to the data management unit 12 and instructs the data management unit 12 to record the SC response result data.

Then, in response to the instruction from the data transmission/reception unit 11, the data management apparatus 100 accesses the management data storage unit 12, refers to the management data 90D, adds a new data space (data set) of the SC request corresponding to the completed service (response completed), and records the values of each of the data items in the management data 90D based on the SC response result data (Step S120).

More specifically, the data management unit 12 issues an ID upon receiving the SC response result data, adds the ID to the value of the item "history ID", and generates a data space to which new response status data of the SC request is recorded. Then, the data management unit 12 records the current date and time to the value of the item "date/time" in association with the item "history ID".

Further, the data management unit 12 records an SC request type and a specific type included in the received SC response result data to the value of the item "type" and the item "specific type" in association with the item "history ID". Further, the data management unit 12 records a device identifier of the electronic device 310 (completed response device) included in the received SC response result data to the value of the item "device type (ID)" in association with the item "history ID". Further, the data management unit 12 records a response status value included in the received SC response result data to the value of the item "response status" in association with the item "history ID".

Accordingly, a new data set of the received SC request is added to the management data 90D, and a response status in response to the most recent SC request (completed state) is recorded.

Hence, with the data management apparatus 100 according to the above-described embodiment of the present invention, an SC request from the device management apparatus 300 installed in the customer environment 30 or completion of a response responsive to the SC request (request response completion) can be recorded, and a history of the status of the request response can be managed.

<<Operation of Updating Management Data in a Case of Receiving Inquiry Request from Terminal>>

Figure 7:
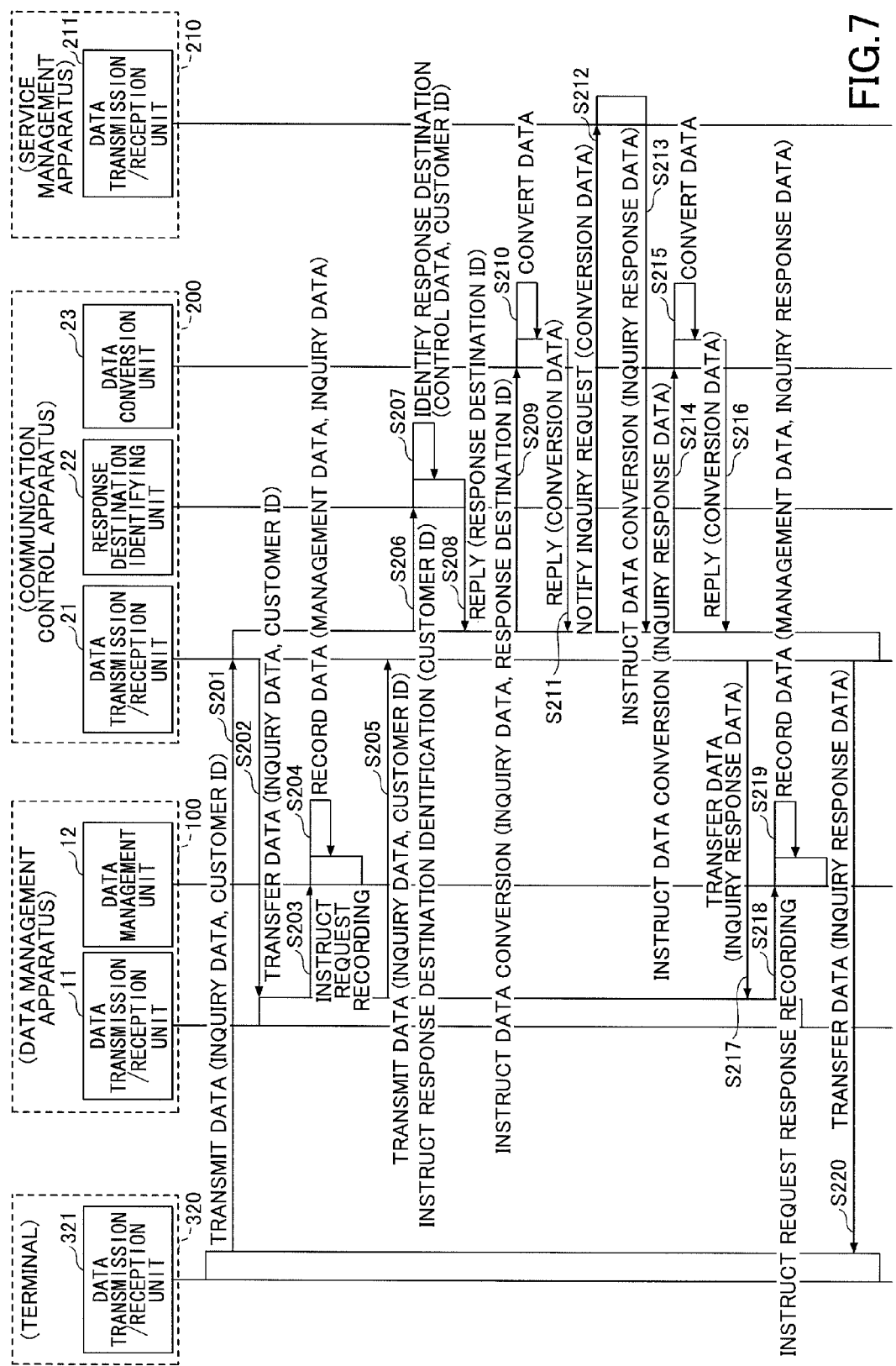
FIG. 7 is a sequence diagram illustrating an operation of updating management data (part 2) according to an embodiment of the present invention.

FIG. 7 is a sequence diagram illustrating an operation of updating management data 90D (part 2) according to an embodiment of the present invention.

As illustrated in FIG. 7, in a case where the terminal 320 receives an inquiry from a customer using a help desk function of the terminal 320, the terminal notifies an inquiry request to the communication control apparatus 200. The terminal 320 notifies the inquiry request by transmitting inquiry data input by the customer to the communication control apparatus 200 by way of the data transmission/reception unit 321 (Step S201). In Step S201, the data transmission/reception unit 21 transfers customer ID data together with the received inquiry data to the communication control apparatus 200.

The data management apparatus 100 receives the inquiry request by receiving the inquiry data transmitted from the communication control apparatus 200 with the data transmission/reception unit 11. Further, the data management apparatus 100 instructs the data management unit 12 to record the received inquiry request (Step S203). In Step S203, the data transmission/reception unit 11 provides the inquiry data to the data management unit 12 and instructs the data management unit 12 to record the inquiry request.

In response to the inquiry request, the data management apparatus 100, by using the data management unit 12, accesses the management data storage unit 90, refers to the management data 90D, adds a new data space (data set) corresponding to the inquiry request, and records values to corresponding data items of the management data 90D based on the inquiry data (Step S204).

More specifically, the data management unit 12 adds an ID (which is issued when the data transmission/reception unit 11 receives the inquiry data) to the value of the item "history ID" and generates a data space to which a new response status history of the inquiry request is recorded. Then, the data management unit 12 records the current date and time to the value of the item "date/time" in association with the item "history ID".

Further, the data management unit 12 records a type of inquiry request and a specific type of inquiry included in the received inquiry data to the value of the item "type" and the item "specific type" in association with the item "history ID". Further, the data management unit 12 records a response status value included in the received inquiry data to the value of the item "response status" in association with the item "history ID".

Accordingly, a new data set of the received inquiry request is added to the management data 90D, and a response status in response to the most recent inquiry request (requesting state) is recorded.

Then, the data management apparatus 100 notifies the inquiry request to the communication control apparatus 200 by transferring the inquiry data to the communication control apparatus 200 by using the data transmission/reception unit 11 (Step S205). In Step S205, the data transmission/reception unit 11 transfers the customer ID data together with the inquiry data.

The communication control apparatus 200 receives the inquiry request by receiving the inquiry data transmitted from the data management apparatus 100 by using the data transmission/reception unit 21. Then, the communication control apparatus 200 instructs the response destination identifying unit 22 to identify the response destination (distributor) of the received inquiry data (Step S206). In Step S206, the data transmission/reception unit 21 instructs the response destination identifying unit 22 to identify the response destination by providing the received customer identification data together with the inquiry data to the response destination identifying unit 22.

In response to the instruction from the data transmission/reception unit 21, the communication control apparatus 200 accesses the control data storage unit 80, refers to the control data 80D, and identifies the response destination (distributor) corresponding the received inquiry request based on the customer ID data by using the response destination identifying unit 22 (Step S207).

More specifically, the response destination identifying unit 22 refers to the control data 80D based on the received customer ID data and identifies the service management apparatus 210 which is to be the transfer destination of the inquiry data. The response destination identifying unit 22 refers to the item "customer ID" of the control data 80D and identifies a data set having an item value matching that of the received customer ID data. The response destination identifying unit 22 identifies the service management apparatus 210 (transfer destination of inquiry data) based on the value of the item "response destination ID" included in the identified data set.

The communication control apparatus 200 transmits a reply indicating the ID data of the distributor (response destination) identified by the response destination identifying unit 22 to the data transmission/reception unit 21 (Step S208). In Step S208, the response destination identifying unit 22 transmits a response indicating the response destination ID data included in the data set identified based on the customer identification data to the data transmission/reception unit 21.

Then, when the communication control apparatus 200 receives the response indicating the response destination, the communication control apparatus 200, by using the data transmission/reception unit 21, instructs the data conversion unit 23 to convert the inquiry request to a data specification complying with that of the response destination (Step S209). In Step S209, the data transmission/reception unit 21 sends the response destination ID data together with the received inquiry data to the data conversion unit 23 and instructs data conversion to the data conversion unit 23.

In response to the instruction from the data transmission/reception unit 21, the communication control apparatus 200, by using the data conversion unit 23, converts the inquiry data to data having a data specification (data specification of an SMS function) complying with the data specification of the service management apparatus 210 identified according to the response destination ID data (Step S210).

The communication control apparatus 200 replies to the data conversion instruction by sending the converted inquiry data converted by the data conversion unit 23 to the data transmission/reception unit 21 (Step S211).

Then, the communication control apparatus 200 notifies the inquiry request to the service management apparatus 210 by transferring the converted inquiry data to the service management 210 of the identified distributor by way of the data transmission/reception unit 21 (Step S212).

As a result, the data transmission/reception unit 211 of the service management apparatus 210 receives the inquiry request by receiving the converted inquiry data. Thereby, the inquiry request is assigned to the person or personnel of the distributor according to the SMS function. As a result, the person or personnel conducts a response service responsive to the inquiry request (e.g., replying (answering) to the inquiry from the customer). In Step S212, the data transmission/reception unit 211 records the received inquiry request in the service record data storage unit 70 based on the received converted inquiry data. Then, after the person or personnel completes conducting the service responsive to the inquiry request, a service report by the person or personnel (reply (answer) complete) is recorded in the service record data storage unit 70.

Then, the service management apparatus 210 notifies the result of the service (response) responsive to the inquiry request (inquiry request response) to the communication control apparatus 200 by transmitting an inquiry response result data based on the service report from the data transmission/reception unit 211 to the communication control apparatus 200 (Step S213).

Then, the communication control apparatus 200 receives the result of the inquiry request response by receiving the inquiry request response data transmitted from the service management apparatus 210 with the data transmission/reception unit 21. Thereby, the data transmission/reception unit 21 instructs the data conversion unit 23 to convert the result of the inquiry request response data to a data specification complying with the transfer destination (Step S214). In Step S214, the data transmission/reception unit 21 sends the received inquiry response result data to the data conversion unit 23 and instructs the data conversion unit 23 to perform data conversion.

Then, in response to the instruction from the data transmission/reception unit 21, the data conversion unit 23 converts the inquiry response result data to data having a data specification (data specification of an integrating function) complying with the data management apparatus 100 (transfer destination of the inquiry response result data) (Step S215).

Then, the communication control apparatus 200 replies to the data conversion instruction by sending the conversion data of the inquiry response result data (converted by the data conversion unit 23) to the data transmission/reception unit 21 (Step S216).

Then, the communication control apparatus 200 notifies the result of the inquiry request response to the data management apparatus 100 by transferring the converted data of the inquiry response result data from the data transmission/reception unit 21 to the data management apparatus 100 (Step S217).

Then, the data management apparatus 100 receives the result of the inquiry request response by receiving the inquiry response result data transmitted from the communication control apparatus 200 with the data transmission/reception unit 11. Then, the data transmission/reception unit 11 instructs the data management unit 12 to record the received inquiry response result data (Step S218). In Step S218, the data transmission/reception unit 11 sends the received inquiry response result data to the data management unit 12 and instructs the data management unit 12 to record the inquiry response result data.

Then, in response to the instruction from the data transmission/reception unit 11, the data management apparatus 100 accesses the management data storage unit 12, refers to the management data 90D, adds a new data space (data set) of the inquiry request corresponding to the completed service (response completed), and records the values of each of the data items in the management data 90D based on the inquiry response result data (Step S219).

More specifically, the data management unit 12 issues an ID upon receiving the inquiry response result data, adds the ID to the value of the item "history ID", and generates a data space to which new response status data of the inquiry request is recorded. Then, the data management unit 12 records the current date and time to the value of the item "date/time" in association with the item "history ID".

Further, the data management unit 12 records an inquiry request type and a specific type included in the received inquiry response result data to the value of the item "type" and the item "specific type" in association with the item "history ID". Further, the data management unit 12 records a device identifier of the electronic device 310 (completed response device) included in the received inquiry response result data to the value of the item "device type (ID)" in association with the item "history ID". Further, the data management unit 12 records a response status value included in the received inquiry response result data to the value of the item "response status" in association with the item "history ID".

Accordingly, a new data set of the received inquiry request is added to the management data 90D, and a response status in response to the most recent inquiry request (replied state) is recorded.

Hence, with the data management apparatus 100 according to the above-described embodiment of the present invention, receiving of an inquiry request from the terminal 320 installed in the customer environment 30 or replying (completion) of an inquiry response responsive to the inquiry request (request response completion) can be recorded, and a history of the status of the request response can be managed.

The communication control apparatus 200 notifies the replying to the inquiry by transferring converted inquiry response result data from the data transmission/reception unit 21 to the terminal 320 (Step S220).

Accordingly, the customer that sent the inquiry can confirm the reply from the person or personnel of the distributor by way of, for example, a screen of the terminal 320.

<<Operation of Updating Management Data in a Case of Receiving Configuration Change Request from Management Terminal>>

Figure 8:
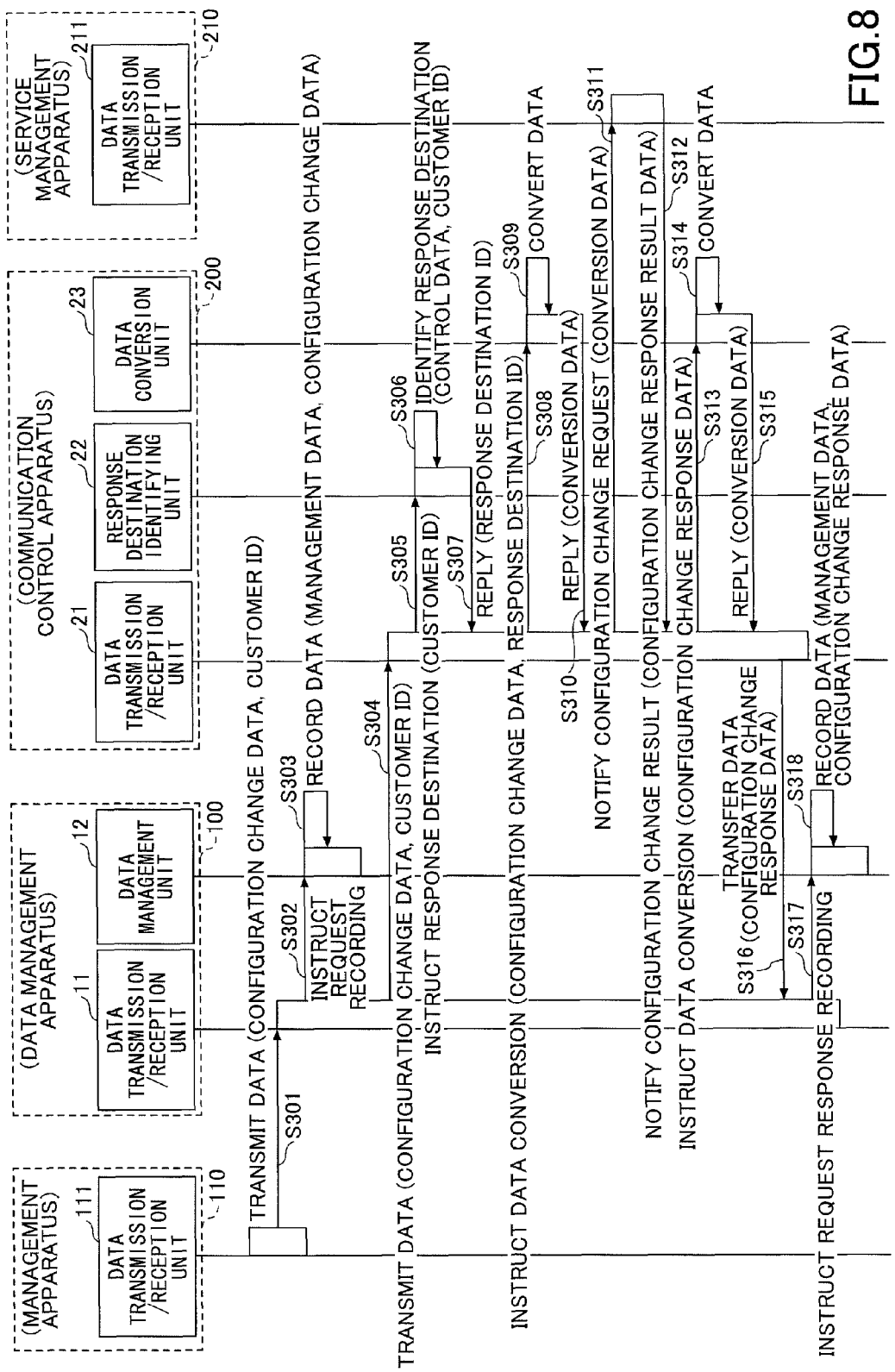
FIG. 8 is a sequence diagram illustrating an operation of updating management data (part 3) according to an embodiment of the present invention.

FIG. 8 is a sequence diagram illustrating an operation of updating management data 90D (part 3) according to an embodiment of the present invention.

As illustrated in FIG. 8, in a case where the data management apparatus 100 receives input data indicating change of configuration of an electronic device 310 installed in the customer environment 30 (configuration change data) from a person or personnel of the manufacturer using a customer portal function of the management apparatus 110, the management apparatus 11 notifies the configuration change to the data management apparatus 100 (configuration change request) by transmitting the input configuration change data to the data management apparatus 100 (Step S301). In Step S301, the data transmission/reception unit 111 transmits customer ID data together with the received configuration change data to the communication control apparatus 11.

The data management apparatus 100 receives the configuration change request by receiving the configuration change data transmitted from the management terminal 110 with the data transmission/reception unit 11. Further, the data management apparatus 100 instructs the data management unit 12 to record the received configuration change request (Step S302). In Step S302, the data transmission/reception unit 11 provides the configuration change data to the data management unit 12 and instructs the data management unit 12 to record the configuration change request.

In response to the configuration change request, the data management apparatus 100, by using the data management unit 12, accesses the management data storage unit 90, refers to the management data 90D, adds a new data space (data set) corresponding to the configuration change request, and records values to corresponding data items of the management data 90D based on the configuration change data (Step S303).

More specifically, the data management unit 12 adds an ID (which is issued when the data transmission/reception unit 11 receives the configuration change data) to the value of the item "history ID" and generates a data space to which a new response status history of the configuration change request is recorded. Then, the data management unit 12 records the current date and time to the value of the item "date/time" in association with the item "history ID".

Further, the data management unit 12 records a type of configuration change request and a specific type of configuration change included in the received configuration change data to the value of the item "type" and the item "specific type" in association with the item "history ID". Further, the data management unit 12 records a response status value included in the received configuration change data to the value of the item "response status" in association with the item "history ID".

Accordingly, a new data set of the received inquiry request is added to the management data 90D, and a response status in response to the most recent configuration change request (requesting state) is recorded.

Then, the data management apparatus 100 notifies the configuration change request to the communication control apparatus 200 by transferring the configuration change data to the communication control apparatus 200 by using the data transmission/reception unit 11 (Step S304). In Step S304, the data transmission/reception unit 11 transfers the customer ID data together with the configuration change data.

The communication control apparatus 200 receives the configuration change request by receiving the configuration change data transmitted from the data management apparatus 100 by using the data transmission/reception unit 21. Then, the communication control apparatus 200 instructs the response destination identifying unit 22 to identify the response destination (distributor) of the received inquiry data (Step S305). In Step S305, the data transmission/reception unit 21 instructs the response destination identifying unit 22 to identify the response destination by providing the received customer identification data together with the configuration change data to the response destination identifying unit 22.

In response to the instruction from the data transmission/reception unit 21, the communication control apparatus 200 accesses the control data storage unit 80, refers to the control data 80D, and identifies the response destination (distributor) corresponding the received inquiry request based on the customer ID data by using the response destination identifying unit 22 (Step S306).

More specifically, the response destination identifying unit 22 refers to the control data 80D based on the received customer ID data and identifies the service management apparatus 210 which is to be the transfer destination of the configuration change data. The response destination identifying unit 22 refers to the item "customer ID" of the control data 80D and identifies a data set having an item value matching that of the received customer ID data. The response destination identifying unit 22 identifies the service management apparatus 210 (transfer destination of configuration change data) based on the value of the item "response destination ID" included in the identified data set.

The communication control apparatus 200 transmits a reply indicating the ID data of the distributor (response destination) identified by the response destination identifying unit 22 to the data transmission/reception unit 21 (Step S307).

In Step S307, the response destination identifying unit 22 transmits a response indicating the response destination ID data included in the data set identified based on the customer identification data to the data transmission/reception unit 21.

Then, when the communication control apparatus 200 receives the response indicating the response destination, the communication control apparatus 200, by using the data transmission/reception unit 21, instructs the data conversion unit 23 to convert the configuration change request to a data specification complying with that of the response destination (Step S308). In Step S308, the data transmission/reception unit 21 sends the response destination ID data together with the received configuration change data to the data conversion unit 23 and instructs data conversion to the data conversion unit 23.

In response to the instruction from the data transmission/reception unit 21, the communication control apparatus 200, by using the data conversion unit 23, converts the configuration change data to data having a data specification (data specification of an SMS function) complying with the data specification of the service management apparatus 210 identified according to the response destination ID data (Step S309).

The communication control apparatus 200 replies to the data conversion instruction by sending the converted configuration change data converted by the data conversion unit 23 to the data transmission/reception unit 21 (Step S310).

Then, the communication control apparatus 200 notifies the configuration change request to the service management apparatus 210 by transferring the converted configuration change data to the service management 210 of the identified distributor by way of the data transmission/reception unit 21 (Step S311).

As a result, the data transmission/reception unit 211 of the service management apparatus 210 receives the configuration change request by receiving the converted configuration change data. Thereby, the configuration change request is assigned to the person or personnel of the distributor according to the SMS function. As a result, the person or personnel conducts a response service responsive to the configuration change request (e.g., replacement of the electronic device 310). In Step S311, the data transmission/reception unit 211 records the received configuration change request in the service record data storage unit 70 based on the received converted configuration change data. Then, after the person or personnel completes conducting the service responsive to the configuration change request, a service report by the person or personnel (configuration change complete) is recorded in the service record data storage unit 70.

Then, the service management apparatus 210 notifies the result of the service (response) responsive to the configuration change request (configuration change request response) to the communication control apparatus 200 by transmitting a configuration change response result data based on the service report from the data transmission/reception unit 211 to the communication control apparatus 200 (Step S312).

Then, the communication control apparatus 200 receives the result of the configuration change request response by receiving the configuration change request response data transmitted from the service management apparatus 210 with the data transmission/reception unit 21. Thereby, the data transmission/reception unit 21 instructs the data conversion unit 23 to convert the result of the configuration change request response data to a data specification complying with the transfer destination (Step S313). In Step S313, the data transmission/reception unit 21 sends the received configuration change response result data to the data conversion unit 23 and instructs the data conversion unit 23 to perform data conversion.

Then, in response to the instruction from the data transmission/reception unit 21, the data conversion unit 23 converts the configuration change response result data to data having a data specification (data specification of an integrating function) complying with the data management apparatus 100 (transfer destination of the configuration change response result data) (Step S314).

Then, the communication control apparatus 200 replies to the data conversion instruction by sending the conversion data of the configuration change response result data (converted by the data conversion unit 23) to the data transmission/reception unit 21 (Step S315).

Then, the communication control apparatus 200 notifies the result of the configuration change request response to the data management apparatus 100 by transferring the converted data of the configuration change response result data from the data transmission/reception unit 21 to the data management apparatus 100 (Step S316).

Then, the data management apparatus 100 receives the result of the configuration change request response by receiving the configuration change response result data transmitted from the communication control apparatus 200 with the data transmission/reception unit 11. Then, the data transmission/reception unit 11 instructs the data management unit 12 to record the received configuration change response result data (Step S317). In Step S317, the data transmission/reception unit 11 sends the received configuration change response result data to the data management unit 12 and instructs the data management unit 12 to record the configuration change response result data.

Then, in response to the instruction from the data transmission/reception unit 11, the data management apparatus 100 accesses the management data storage unit 90, refers to the management data 90D, adds a new data space (data set) of the configuration change request corresponding to the completed service (response completed), and records the values of each of the data items in the management data 90D based on the configuration change response result data (Step S318).

More specifically, the data management unit 12 issues an ID upon receiving the configuration change response result data, adds the ID to the value of the item "history ID", and generates a data space to which new response status data of the configuration change request is recorded. Then, the data management unit 12 records the current date and time to the value of the item "date/time" in association with the item "history ID".

Further, the data management unit 12 records a configuration change request type and a specific type included in the received configuration change response result data to the value of the item "type" and the item "specific type" in association with the item "history ID". Further, the data management unit 12 records a device identifier of the electronic device 310 (completed response device) included in the received configuration change response result data to the value of the item "device type (ID)" in association with the item "history ID". Further, the data management unit 12 records a response status value included in the received configuration change response result data to the value of the item "response status" in association with the item "history. ID".

Accordingly, a new data set of the received configuration change request is added to the management data 90D, and a response status in response to the most recent configuration change request (completed state) is recorded.

Hence, with the data management apparatus 100 according to the above-described embodiment of the present invention, requesting of a configuration change request (of an electronic device 310 in the customer environment) from the management terminal 110 installed in the manufacturer environment 10 or completion of a request response responsive to the configuration change request (request response completion) can be recorded, and a history of the status of the request response can be managed.

<<Outputting of Report>>

Figure 9:
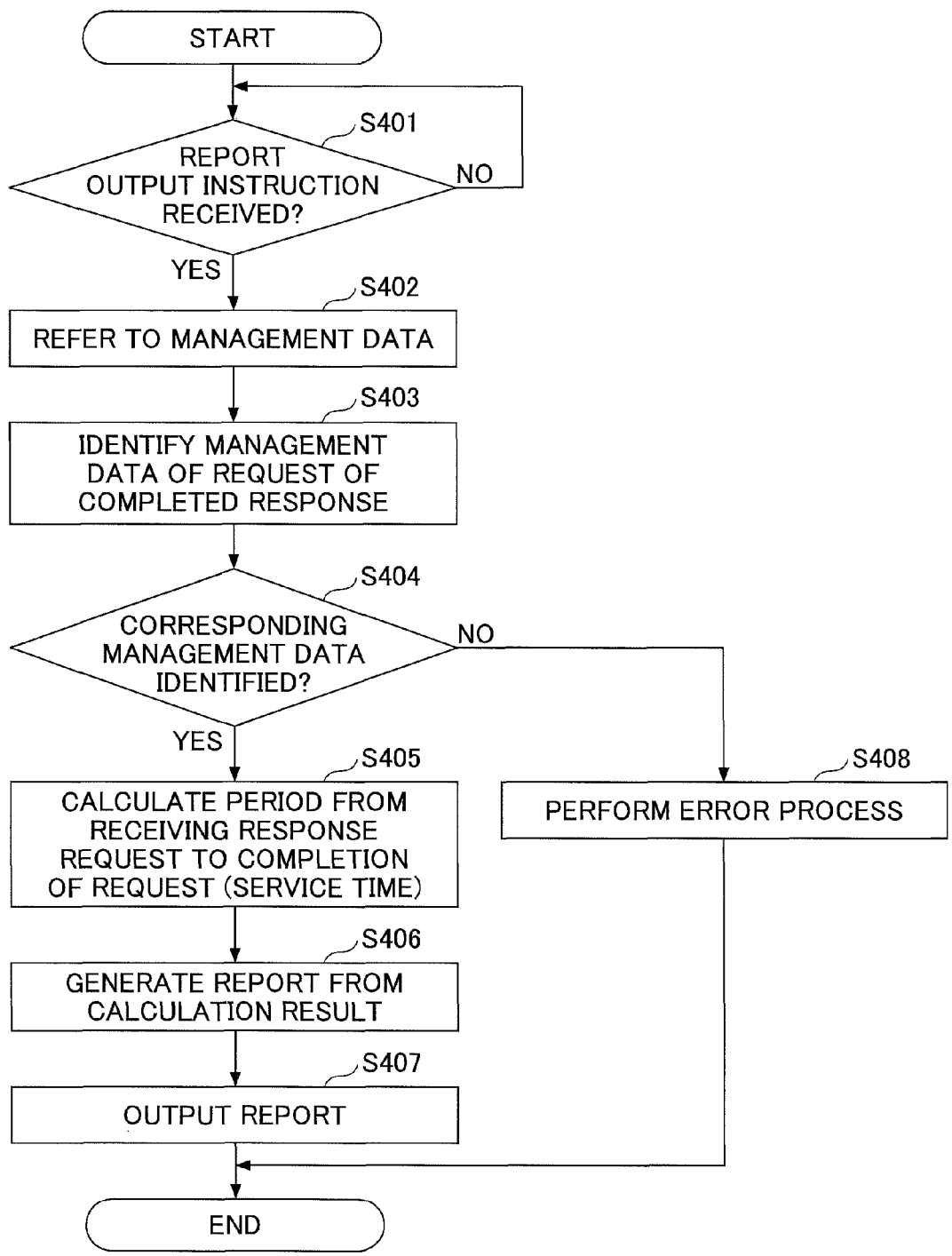
FIG. 9 is a flowchart illustrating an operation of outputting a report according to an embodiment of the present invention.

FIG. 9 is a flowchart illustrating an operation of outputting a report according to an embodiment of the present invention. The operation of FIG. 9 is performed by a report generation unit 13 included in the data management apparatus 100 according to an embodiment of the present invention. Next, an example of requesting generation of a report for the purpose of proposing improvement of response quality with respect to various requests (in this example, proposing improvement of rapidness) is used for describing the operation of outputting an report according to an embodiment of the present invention.

As illustrated in FIG. 9, in a case where the report generation unit 13 receives a request (instruction) to output a report (Yes in Step S401), the report generation unit 13 accesses the management data storage unit 90 and refers to the management data 90D having the history of various request response statuses recorded thereto (Step S402).

Then, the report generation unit 13 identifies a data set of a request(s) of a completed response from the management data 90D (Step S403). In Step S403, the report generation unit 13 identifies a data set in the management data 90D. The identified data set is a data set having "complete" recorded in the value of the item "response status" of the management data 90D.

For example, in the management data 90D illustrated in FIG. 4, data sets having history ID from "5" to "8" of the management data 90D are identified.

Then, it is determined whether corresponding data sets (management data of requests corresponding to completed responses) have been identified (Step S404).

In a case where corresponding data sets cannot be identified (No in Step S404), a predetermined error process is performed. In this error process, the one having requested the output of the report is notified that the requested report cannot be output. The method for notifying the inability to output the report may be, for example, displaying the notification or transmitting the notification.

In a case where corresponding data sets can be identified (Yes in Step S404), a period between receiving a response request and completing the request response (service time) is calculated based on the referred data sets of the management data 90D (Step S405). In Step S405, the report generation unit 13 identifies data sets of the management data 90D having items "device type (ID)" and "specific type" that match those of data sets identified beforehand. Further, the report generation unit 13 identifies a data set having "requesting" recorded in the item "response status" from the data sets of the identified management data 90D. In other words, the report generation unit 13 identifies the history data of a target electronic device 310 at the timing of receiving a response request and the history data of the target electronic device at the timing of completing a response responsive to the response request. That is, the report generation unit 13 identifies a combination of 2 data sets of management data in which one data set has a response status of "requesting" response status and another data set has a response status "complete".

For example, in a case where a data set R2 of the management data 90D is identified as management data of a request of a completed response from the management data illustrated in FIG. 4, a data set R1 of the management data 90D is identified where the item [specific type] and the item [device type (ID)] of the data set R1 match those of the data set R3 (i.e. [specific type] being "out of paper" and [device type (ID)]) being "MFP 001") and the item [response status] of the data set R2 is "complete".

As a result, the report generation unit 13 calculates a period from receiving a response request to completing a response responsive to the response request (service time) based on the item [date/time] of the two identified data sets of the management data 90D. More specifically, the report generation unit 13 calculates the period from receiving a response request to completing a response responsive to the response request (service time) by subtracting the value of item [date/time] of the data set of management data 90D having "requesting" as the item [response status] from the value of item [date/time] of the data set of management data 90D having "complete" as the item [response status].

For example, in a case where the data set R2 and the data set R1 of the management data 90D are identified, a period of "15 (minutes)" is calculated by subtracting the value "2011/04/01 13:00" of item [date/time] of the data set R1 of the management data 90D from the value "2011/04/01 13:15" of item [date/time] of the data set R1 of the management data 90D.

Then, the report generation unit 13 gathers, for example, the service times of multiple request responses (response completion periods) based on the calculation results (calculated values), generates report data based on the gathered results (Step S406), and outputs the generated report data (Step S407). The method for outputting the report data may be, for example, displaying the report data or transmitting the report data.

Next, a detailed example of outputting the report data is described with reference to FIGS. 10 and 11.

<<Outputting of Report Data>>

Figure 10:
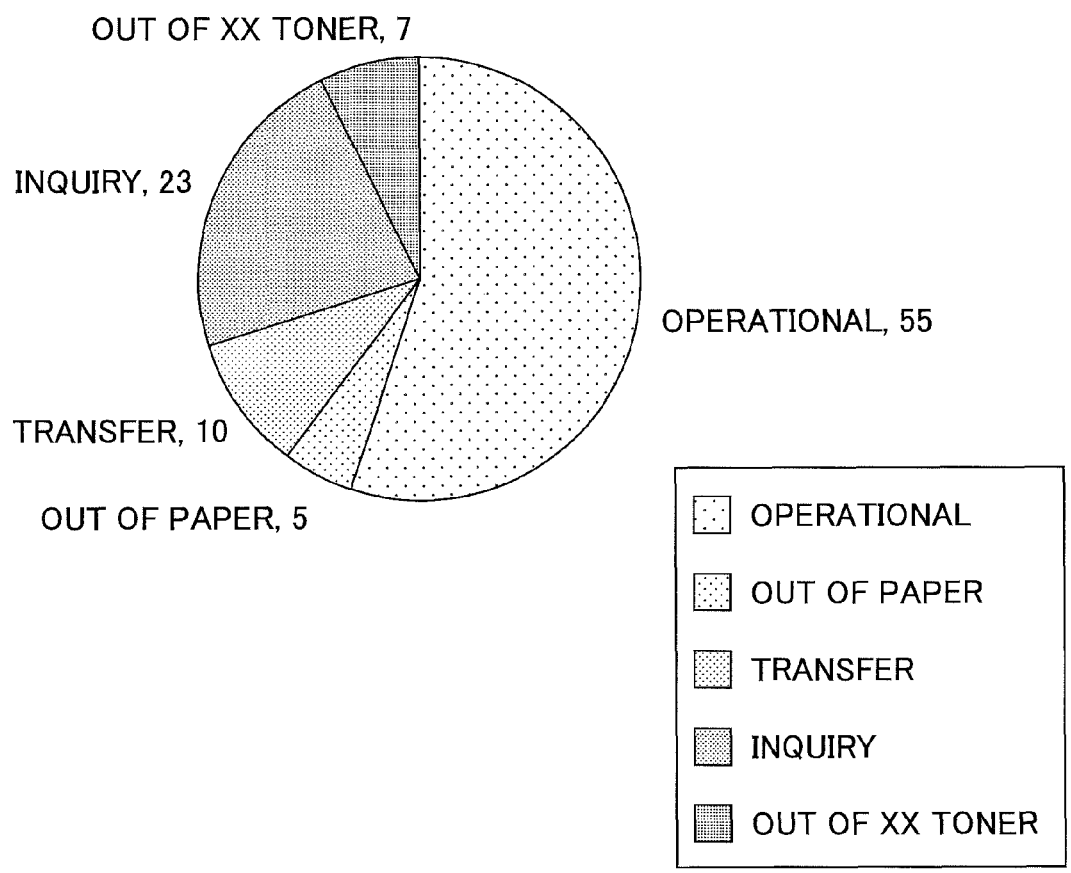
FIG. 10 is a schematic diagram illustrating output (data display) of report data indicating the operating rate of all target management devices (entire operating rate) according to an embodiment of the present invention.

FIG. 10 is a schematic diagram illustrating output (data display) of report data indicating the operating rate of all target management devices (entire operating rate) according to an embodiment of the present invention. As illustrated in FIG. 10, it can be understood that the entire operating rate of the target management devices is 55%. Further, it can be understood that the proportion of the service time pertaining to the status "out of paper" (corresponding to the item [specific type] "out of paper" of FIG. 4) of all of the target management devices is 5%. That is, the time of being inoperable of all of the target management devices due to "out of paper" is 5%. The totalized proportion of the time of being inoperable with respect to all target management devices may also be hereinafter referred to as "entire non-operating rate". Likewise, it can be understood that the time of being inoperable of all of the target management devices due to "transfer" (corresponding to the item [specific type] "transfer of device" of FIG. 4) is 10%. Likewise, it can be understood that the time of being inoperable of all of the target management devices due to "inquiry" (corresponding to the item [specific type] "inquiry" of FIG. 4) is 23%. Likewise, it can be understood that the time of being inoperable of all of the target management devices due to "out of toner" (corresponding to the item [specific type] "out of toner" of FIG. 4) is 7%. Each of these entire non-operating rates may also be hereinafter referred to as "entire non-operating rate of each non-operating factor".

The entire operating rate (or entire non-operating rate) of the target management devices illustrated in FIG. 10 can be obtained by the following procedures. These procedures are performed by the report generation unit 13 included in the data management apparatus 100.

First, data pertaining to the service time of request responses (response completion period) is totalized (gathered) by performing Steps S402 to S405 of FIG. 9. In this example, the data pertaining to the service time of request responses is totalized (gathered) in correspondence with each [specific type] (i.e. each factor causing non-operation). As a result, the total service time for each non-operating factor "out of paper", "transfer", "inquiry", and "out of toner" is obtained. Such total may hereinafter also be referred to as "total service time of each non-operating factor".

Then, a "totalized period" is obtained by subtracting the value of item "date/time" of an earliest (first) data set among all data sets of the management data 90D from the value of item "date/time" of a latest (last) data set among all data sets of the management data 90D. The "totalized period" is a period of a target that is to be totalized and output as report data. For example, in a case where data sets having history IDs of 1 to 8 in FIG. 8 are all data sets of the management data 90D, a totalized period of 3 hours and 30 minutes (=210 minutes) is obtained by subtracting a value "2011/04/01 13:00" of item [date/time] of the last data set (corresponding to [history ID] of 8) from a value "2011/04/01 16:30" of item [date/time] of the first data set (corresponding to [history ID] of 1).

Then, the "totalized period" is multiplied with the number of all target management devices, to thereby obtain "total of totalized period". For example, in a case where data sets having history IDs of 1 to 8 in FIG. 8 are all data sets of the management data 90D, the contents (data) of all target management devices are included, and the number of all target management devices are 4 (MFP 001, MFP 002, PJ 001, MFP 004), the "total of totalized period" in this case is 14 hours (=3 hours 30 minutes×4=840 minutes).

Then, by dividing each of "total service time of each non-operating factor" with the "total of totalized period", the above-described "entire non-operating rate of each non-operating factor" can be obtained.

For example, in a case where data sets having history IDs of 1 to 8 in FIG. 8 are all data sets of the management data 90D, the contents (data) of all target management devices are included, the "total service time of each non-operating factor" for "out of paper" (corresponding to history IDs of 1 and 5) is 15 minutes, the "total service time of each non-operating factor" for "out of toner" (corresponding to history IDs of 2 and 6) is 10 minutes, the "total service time of each non-operating factor" for "transfer" (corresponding to history IDs of 3 and 7) is 15 minutes, and the "total service time of each non-operating factor" for "inquiry" (corresponding to history IDs of 4 and 8) is 30 minutes, each "total service time of each non-operating factor" is divided with the "total of totalized period" of 840 minutes. Accordingly, an entire non-operating rate of each non-operating factor with respect to "out of paper" is approximately 1.8% (15/840), an entire non-operating rate of each non-operating factor with respect to "out of toner" is approximately 1.2% (10/840), an entire non-operating rate of each non-operating factor with respect to "transfer" is approximately 1.8% (15/840), and an entire non-operating rate of each non-operating factor with respect to "inquiry" is approximately 3.6% (30/840). Therefore, the sum of the entire non-operating rates is approximately 8.4%. Therefore, an entire operating rate of approximately 91.6% is obtained (100−approximately 8.4).

The report data indicating the entire operating rate illustrated in FIG. 10 can be generated with respect to, for example, each business facility. Thus, by totalizing the data of all target management devices of each business facility by performing the above-described steps, report data indicating the entire operating rate (as illustrated in FIG. 10) can be generated.

FIG. 11 is a schematic diagram illustrating output (data display) of report data indicating the operating rate of each target management device according to an embodiment of the present invention. For example, FIG. 11 illustrates that the operating rate of a target management device "device A" is 99%, and the non-operating rate of "device A" is 1%. In this example, "non-operating rate of respective non-operating factor" indicates a proportion of time in which a single target management device is inoperable due to a non-operating factor causing the target management device to be inoperable (corresponding to the values of item [specific type] in FIG. 4). Likewise, the target management device "device D" has an operating rate of 62%, a non-operating rate of respective non-operating factor "out of paper" is 6%, a non-operating rate of respective non-operating factor "out of toner" is 7%, a non-operating rate of respective non-operating factor "inquiry" is 20%, and a non-operating rate of respective non-operating factor "transfer" is 5%.

The operating rate (or non-operating rate) of each target management device illustrated in FIG. 11 can be obtained by the following procedures. These procedures are performed by the report generation unit 13 included in the data management apparatus 100.

Similar to obtaining the "entire operating rate", first, data pertaining to the service time of request responses (response completion period) is totalized (gathered) by performing Steps S402 to S405 of FIG. 9. In this example, the data pertaining to the service time of request responses is totalized (gathered) in correspondence with each [specific type] (i.e. each factor causing non-operation). As a result, the total service time for each non-operating factor "out of paper", "transfer", "inquiry", and "out of toner" with respect to each target management apparatus is obtained. Such total may hereinafter also be referred to as "total service time of each non-operating factor with respect to each target management apparatus".

Then, total service time of each non-operating factor with respect to each target management apparatus is divided by the "totalized period". As a result, the "non-operating rate of respective non-operating factor" can be obtained with respect to each target management apparatus. Then, a total (sum) of "non-operating rate of respective non-operating factor" with respect to each target management apparatus is obtained. Then, the operating rate with respect to each target management apparatus with respect to each target management apparatus can be obtained by subtracting the obtained total from 100%.

For example, in a case where data sets having history IDs of 1 to 8 in FIG. 8 are all data sets of the management data 90D, the contents (data) of all target management devices are included, and the "total service time of each non-operating factor with respect to each target management apparatus" for "out of paper" of device type "MFP 001" is 15 minutes, the non-operating rate of respective non-operating factor "out of paper" is approximately 7.1% (=15/210). Likewise, in a case where the "total service time of each non-operating factor with respect to each target management apparatus" for "out of toner" of device type "MFP 002" is 10 minutes, the non-operating rate of respective non-operating factor "out of toner" is approximately 4.8% (=10/210). Likewise, in a case where the "total service time of each non-operating factor with respect to each target management apparatus" for "transfer" of device type "PJ 001" is 15 minutes, the non-operating rate of respective non-operating factor "transfer" is approximately 7.1% (=15/210). Likewise, in a case where the "total service time of each non-operating factor with respect to each target management apparatus" for "inquiry" of device type "MFP 004" is 30 minutes, the non-operating rate of respective non-operating factor "inquiry" is approximately 15.3% (=30/210).

As a result, the operating rate of device type "MFP 001" is approximately 92.9% (=100−approximately 7.1), the operating rate of device type "MFP 002" is approximately 95.2% (=100−approximately 4.8), the operating rate of device type "PJ 001" is approximately 92.9% (=100−approximately 7.1), and the operating rate of device type "MFP 004" is approximately 84.7% (=100−approximately 15.3).

The report data indicating respective operating rates illustrated in FIG. 11 can be generated with respect to, for example, each business facility. Thus, by totalizing the data of each target management device of each business facility by performing the above-described steps, report data indicating the operating rate of each target management device (as illustrated in FIG. 11) can be generated.

By generating the report data indicating the operating rate (as illustrated in FIGS. 10 and 11), a request exhibiting a long response completion period (i.e. factor of inoperability) can be extracted (visualized) from the various requests received from the customer environment 30. Thus, an appropriate proposal for improving rapidity can be made based on the extracted results.

Hence, with the data management system 1 according to the above-described embodiment of the present invention, the communication control apparatus 200 can identify the distributor for performing a response responsive to a request received from the customer, and instruct a service management apparatus 210 of the identified distributor to perform the request of the customer. Further, with the data management system 1 according to the above-described embodiment of the present invention, notification data pertaining to requests from the distributor or the customer can be integrally managed by the data management apparatus 100 installed in, for example, the manufacturer environment, the status of a response to an electronic device 310 can be dynamically totalized (gathered) and output.

Accordingly, with the data management system 1 according to the above-described embodiment of the present invention, when the data management apparatus 100 receives a predetermined response request (notification) from the customer, the data management apparatus 100 records the received response request. Then, in the data management system 1, the communication control apparatus 200 identifies a distributor which is to perform a response responsive to a request from a customer (the identification based on the customer of the request) in accordance with an instruction from the data management apparatus 100. Then, the communication control apparatus 200 notifies the identified the distributor to the data management apparatus 100. Then, when the data management apparatus 100 receives a notification of completion of the response from the distributor via the communication control apparatus 200, the data management apparatus 100 records the received completion notification. Then, the data management apparatus 100 gathers (totalized) data pertaining to the status of the response corresponding to the electronic device 310 and outputs a report based on the gathered data for proposing improvements of the customer environment 30.

Accordingly, the data management system 1 according to the above-described embodiment of the present invention, an automated device management service for conducting integrated management of one or more electronic devices 1 can be provided. As a result, the data management system 1 according to the above-described embodiment of the present invention can provide a high quality device management service.

The above-described device management function can be provided by having a processor (CPU) of the apparatuses and devices constituting the data management system 1 (e.g., terminal 320, device management apparatus 300, the management terminal 110, the data management apparatus 100, the service management apparatus 210, the communication control apparatus 200) execute the steps and processes illustrated in the above-described sequence diagrams and flowcharts with a program (coded with a programming language with a compatible platform).

The program may be recorded in the computer-readable recording medium 103a. Thereby, the program may be installed in a storage device in provided in apparatuses and devices constituting the data management system 1 by way of, for example, the interface device 107. Further, the program may be downloaded from a public service line and installed to the apparatuses and devices constituting the data management system 1 by way of, for example, the interface device 107.

The data such as character string values corresponding to the data items of the management data 90D of the data management apparatus 100 is not limited to those described with FIG. 4. For example, predetermined code values such as type ID, specific type ID, status ID may also be included in the management data 90D. Further, the data for identifying the type of device (device ID) may be an identification value used in a network such as an IP address (global IP address) or a URI (Uniform Resource Identifier).

The value of the item [response destination ID] of the control data 80D of the communication control apparatus 200 is not limited to those described with FIG. 5. For example, the data for identifying the type of device (device ID) may be an identification value used in a network such as an IP address (global IP address) or a URI (Uniform Resource Identifier).

Although the above-described embodiment of the data management system 1 does not have the communication control apparatus 200 installed in the distributor environment 20, the communication control apparatus 200 may be installed, for example, in a distributor environment 20 having a function of integrating multiple distributors.

The present invention is not limited to the specifically disclosed embodiments, and variations and modifications may be made without departing from the scope of the present invention.

The present application is based on Japanese Priority Application Nos. 2011-170177 and 2012-160654 filed on Aug. 3, 2011, and Jul. 19, 2012, respectively, the entire contents of which are hereby incorporated herein by reference.

What is claimed is:

1. A data management system comprising:
    a processor;
    a data management apparatus connected to a first network and configured to, by way of the processor, manage history data of a response request pertaining to an electronic device;
    one or more service management apparatuses connected to a second network and configured to, by way of the processor, manage a response service corresponding to the response request; and
    a communication control apparatus interposed between the data management apparatus and the one or more service management apparatuses and configured to, by way of the processor, control data communications between the first network and the second network;

wherein the data management apparatus includes
- a reception unit configured to receive response request data from an external apparatus and response result data from the communication control apparatus,
- a transmission unit configured to transmit the response request data to the communication control apparatus, and
- a management unit configured to manage a series of response status history data during a period between receiving of the response request data and receiving of the response result data responsive to the response request based on the response request data and the response result data, wherein the communication control apparatus includes
- an identifying unit configured to identify a target service management apparatus from the one or more service management apparatuses that corresponds to a transmission destination of the response request data transmitted from the data management apparatus,
- a reception unit configured to receive the response request data from the data management apparatus and response result data from the target service management apparatus,
- a first transmission unit configured to transmit the response request data to the target service management apparatus,
- a reception unit configured to receive the response result data from the target service management apparatus, and
- a second transmission unit configured to transmit the response result data to the data management apparatus, wherein the identifying unit is configured to identify the target service management apparatus based on a control data including a customer identification data and a response destination identification data that are associated with each other.

2. A data management apparatus for a data management system including first and second networks interposed by a communication control apparatus, the data management apparatus comprising:
- a processor;
- a reception unit configured to, by way of the processor, receive response request data pertaining to an electronic device from an external apparatus and response result data from the communication control apparatus;
- a transmission unit configured to, by way of the processor, transmit the response request data to the communication control apparatus; and
- a management unit configured to, by way of the processor, associate the response request data and the response result data responsive to the response request data, so that a series of response status history data during a period between the receiving of the response request data and the receiving of the response result data are managed as a set based on the response request data and the response result data associated with the response request data;

wherein the data management apparatus is connected to the first network and configured to manage history data of the response request data, wherein one or more service management apparatuses are connected to the second network and configured to manage a response service corresponding to the response request data.

3. The data management apparatus as claimed in claim 2, wherein the management unit is configured to record the response status history data,
wherein the response status history data includes response status data indicating reception of the response request data, type data of the response request, and device identification data of the electronic device,
wherein the response status history data, the type data of the response request data, and the device identification data are associated to each other based on the response request data.

4. The data management apparatus as claimed in claim 2, wherein the management unit is configured to record the response status history data,
wherein the response status history data includes response status data indicating completion of the response service corresponding to the response request data, type data of the response request data, device identification data of the electronic device, and time/date data indicating the time and date of the completion of the response service corresponding to the response request data,
wherein the response status data, the type data of the response request data, and the device identification data are associated to each other based on the response result data.

5. The data management apparatus as claimed in claim 2, wherein the management unit includes
a report generation unit configured to gather status data of the response request data based on the response status history data and generate predetermined report data based on a result of gathering the status data of the response request data.

6. The data management apparatus as claimed in claim 5, wherein the report generation unit is configured to gather data pertaining to the number of times of transmitting the response request data pertaining to the electronic device during a predetermined period based on the response status history data and generate the predetermined report data including a result of gathering the data pertaining to the number of times of sending the response request data.

7. The data management apparatus as claimed in claim 5, wherein the report generation unit is configured to calculate a completion period between receiving of the response request data and completion of the response service based on the response status history data, gather data pertaining to the completion period based on the calculated completion period, and generate the predetermined report data including a result of gathering the data pertaining to the completion period.

8. A communication control apparatus for a data management system having the communication control apparatus interposed between a first network connected to a data management apparatus and a second network connected to one or more service management apparatuses, the communication control apparatus comprising:
- a processor;
- an identifying unit configured to, by way of the processor, identify a target service management apparatus from the one or more service management apparatuses that corresponds to a transmission destination of response request data transmitted from the data management apparatus;
- a reception unit configured to, by way of the processor, receive the response request data from the data management apparatus and response result data from the target service management apparatus;

a first transmission unit configured to, by way of the processor, transmit the response request data to the target service management apparatus;

a second transmission unit configured to, by way of the processor, transmit the response result data to the data management apparatus;

wherein the communication control apparatus is configured to control data communications between the first network and the second network, wherein the identifying unit is configured to identify the target service management apparatus based on a control data including a customer identification data and a response destination identification data that are associated with each other.

9. The communication control apparatus as claimed in claim 8, wherein the reception unit is configured to receive customer identification data that identifies a customer corresponding to the response request data, wherein the identifying unit is configured to refer to the control data wherein the identifying unit is configured to identify the target service management apparatus based on the response destination identification data.

10. The communication control apparatus as claimed in claim 8, further comprising:

a data conversion unit configured to convert communication data between the data management apparatus and the one or more of the service management apparatuses;

wherein the data conversion unit is configured to convert the response request data into first conversion data complying to a predetermined data specification of a function of the target service management apparatus, wherein the first transmission unit is configured to transmit the first conversion data to the target service management apparatus.

11. The communication control apparatus as claimed in claim 10, further comprising:

wherein the data conversion unit is configured to convert the response result data into second conversion data complying to a predetermined data specification of a function of the data management apparatus, wherein the second transmission unit is configured to transmit the second conversion data to the data management apparatus.

* * * * *